(12) United States Patent
Ito et al.

(10) Patent No.: US 6,298,405 B1
(45) Date of Patent: Oct. 2, 2001

(54) DATA COMMUNICATION SYSTEM, PRINTING SYSTEM AND DATA COMMUNICATION APPARATUS

(75) Inventors: Masamichi Ito, Machida; Koji Takahashi, Chigasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/024,187

(22) Filed: Feb. 17, 1998

(30) Foreign Application Priority Data

Feb. 14, 1997 (JP) .................................................. 9-030543
Apr. 7, 1997 (JP) .................................................. 9-088430

(51) Int. Cl.$^7$ .................................................. G06F 13/00
(52) U.S. Cl. .......................................... 710/107; 710/126
(58) Field of Search .................................. 710/100, 113, 710/126, 129, 107

(56) References Cited

U.S. PATENT DOCUMENTS 5,619,646 * 4/1997 Hoch et al. .................... 395/200.01
5,815,205 * 12/1998 Hashimoto et al. ................. 348/373
5,848,420 * 12/1998 Xu ........................................ 707/104

* cited by examiner

Primary Examiner—David Wiley
(74) Attorney, Agent, or Firm—Fitzpatrick, Cella, Harper, & Scinto

(57) ABSTRACT

Disclosed are a data communication method whereby a first and a second node are directly connected so that they can exchange data directly, data communication apparatuses therefor, and a communication system that includes the apparatuses.

A VTR and a printer are connected by an IEEE 1394 cable. When the printer requests the transmission of image data, the VTR transmits pertinent image data to the printer. Since the entry of a predetermined instruction at the operating unit of the VTR is inhibited during the transmission of image data, the occurrence of an obstacle to the transmission of image data can be prevented.

18 Claims, 28 Drawing Sheets

| FIG. 25A | FIG. 25B |

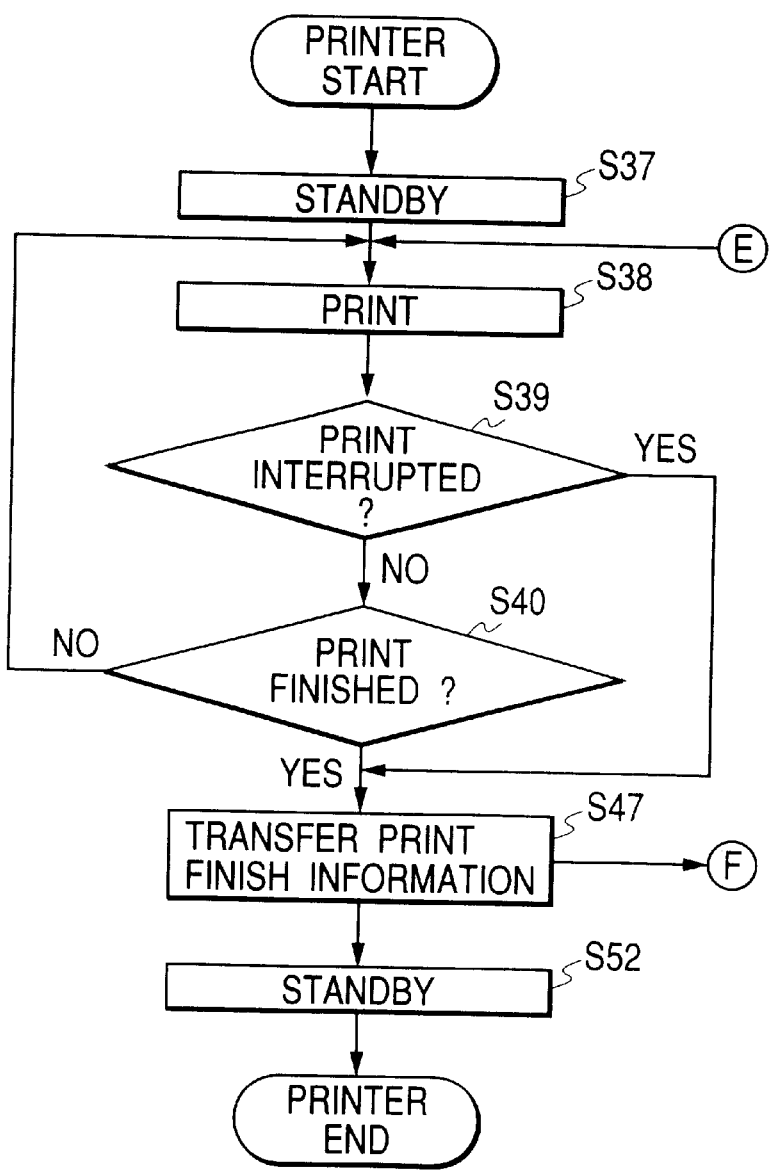

DATA COMMUNICATION SYSTEM, PRINTING SYSTEM AND DATA COMMUNICATION APPARATUS

BACKGROUND OF THE INVENTION

1. Field of the Invention

The present invention relates to a data communication system, a printing system and a data communication apparatus, and in particular to a system in which data are exchanged among apparatuses.

2 Related Background Art

The most frequently employed peripheral devices for personal computers are hard disks and printers. For data communication, these peripheral devices are connected to personal computers by a digital interface (hereinafter referred to as a digital I/F) such as a SCSI IF, which is a typical, general-purpose interface for small computers.

Digital cameras and digital video cameras are also types of peripheral devices used as input means for personal computers (hereinafter referred to as PCs). As the technique has been developed, static pictures and animated pictures acquired by a digital camera or a video camera are fetched to a PC for storage on a hard disk, or are edited by using a PC and are printed on a color printer, and users for the digital cameras are increased.

The image data are transmitted, via the above described SCSI IF, from a PC to a printer or to a hard disk. In order to transmit such a large quantity of image data, a general-purpose digital I/F having a high data transfer rate is required.

As is described above, conventionally, peripheral devices are connected to a host PC, and image data obtained by a camera are printed by routing them through the PC.

FIG. 3 is a block diagram illustrating an example general interface for a PC. A digital camera 31 is connected to a personal computer (PC) 32 by using a digital I/F, and a printer 33 is connected via a SCSI IF.

In FIG. 3, the digital camera 31 comprises: a memory 34, used as a storage unit; an image data decoder 35; an image processing unit 36; a D/A converter 37; a EVF 38 as a display unit; and a digital I/O unit 39.

The PC 32 comprises a digital I/O unit 40, for interfacing the PC 32 with the digital camera 31; an operating unit 41, such as a keyboard or a mouse; an image data decoder 42; a display 43; a hard disk 44; a memory 45, such as a RAM; an MPU 46, used as a processing unit; a PCI bus 47; and a SCSI interface (board) 48, used as a digital I/F. The PC 32 is connected to the printer 33 via the SCSI I/F 48.

The printer 33 comprises: a SCSI interface (I/F) 49, connected to the PC 32 by a SCSI cable; a memory 50; a printer head 51; a printer controller 52; and a driver 53.

With this arrangement, a video signal (image data) obtained by the digital camera 31 is transmitted to the PC 32. The image data are edited by the PC 32 and the edited data are output to the printer 33. When the image data stored in the memory 34 of the digital camera 31 are read, they are decoded by the decoder 35, and the resultant data are processed by the image processing unit 36 for display on the EVF 38. The data are then routed through the D/A converter 37 and displayed on the EVF 38. The image data from the memory 34 are transmitted via a cable from the digital I/O unit 39 to the digital I/O unit 40 in the PC 32.

In the PC 32, the image data received from the digital I/O unit 40 are stored on the hard disk 44 via the PCI bus 47, which is an inter-transmission bus, or are decoded by the decoder 42 and the decoded data are stored in the memory 45 or presented on the display 43. To print the image data, the data are transmitted from the SCSI interface board 48 of the PC 32 along the SCSI cable to the printer 33. The printer 33 receives the image data at the SCSI interface 49, and stores them in the memory 50. Thereafter, the print controller 52 reads the print image data from the memory 50 and outputs them to the driver 53, and images based on the print image data are printed by the printer head 51.

As is described above, conventionally the peripheral devices are connected to the host PC 32, and data are exchanged between the peripheral devices via the PC 32.

However, among the SCSI IF used in the prior art, some have low data transfer rates or require thick cables for parallel communication, and the types and numbers of peripheral devices that can be connected to these IFs, and the connection systems, are limited. In addition, the inconvenience in many aspects is pointed out.

Many common home PCs have connectors on the rear face for connecting the attachment of SCSI and other cables, and the shape and size of the SCSI connector are such that its insertion and removal are not easy. A mobile or portable device, such as a digital camera or a video camera, which is not normally installed, must also be connected to the connector on the rear of the PC, and this is very difficult.

Usually, many peripheral devices are connected to a personal computer. As the types of peripheral devices have increased, and as I/Fs have been developed, in addition to the PC peripheral devices, many digital apparatuses can be connected across a communication network. While for data communication this is very convenient, a very large amount of data are also frequently communicated between specific devices, which will cause a heavy traffic in the network and adversely effect the communication between other devices in the network. For example, if a user desires sequential or rapid image printing, communication between devices that a user is not aware of may affect the whole network of a host PC during the data communication between the PC and a printer, so that image printing can not be normally performed, or is delayed. As is described above, there is also a load imposed on a PC due to the heavy traffic on a network, or a defect of print data communication due to the operating state of the PC.

SUMMARY OF THE INVENTION

To resolve the above shortcomings, it is one object of the present invention to provide a data communication method and apparatus wherein data can be effectively exchanged between a first node and a second node that are directly connected together, and a communication system including such an apparatus.

It is another object of the present invention to provide a data communication method and apparatus that inhibits entry of a predetermined instruction for a first node during the transmission of data by the first node to a second node, and thus prevents the occurrence of errors during data transmission.

To achieve the above objects, according to the present invention a data communication system comprises a first node and a second node that exchange data, the first node including:

instruction entry means manipulated by a user to enter an instruction, transmission means for transmitting pertinent data in response to a data request from the second node, and control means for, during data transmission by the transmission means, inhibiting entry of predetermined instructions at the instruction entry means and providing a predetermined display for the user; and the second node including:

request means for transmitting to the first node a request for the supply of data; and output means for receiving data from the first node in response to the request submitted by the requesting means and for outputting the data.

It is an additional object of the present invention to employ a general-purpose digital I/F (e.g., IEEE 1394-1995 high performance serial bus), which eliminates as much as possible the problems of the conventional digital I/F and which is mounted as standard in each digital device, so that with this digital I/F, data communication on a network, across which a PC, a printer and other peripheral device, and a digital camera or a camera incorporated digital VTR are connected, is implemented. Also implemented is so-called direct printing, in which image data are directly transferred from a digital camera, or a camera incorporated digital VTR, to a printer and are printed.

It is a further object of the present invention to perform arbitration for the operation of a printer and an operating unit in a camera.

Other objects and features of the present invention will become apparent during the course of the following description of the preferred embodiments, while referring to the accompanying drawings.

DETAILED DESCRIPTION OF THE PREFERRED EMBODIMENTS

<First Embodiment>

A first embodiment of the present invention will now be described while referring to the accompanying drawings.

Figure 2:
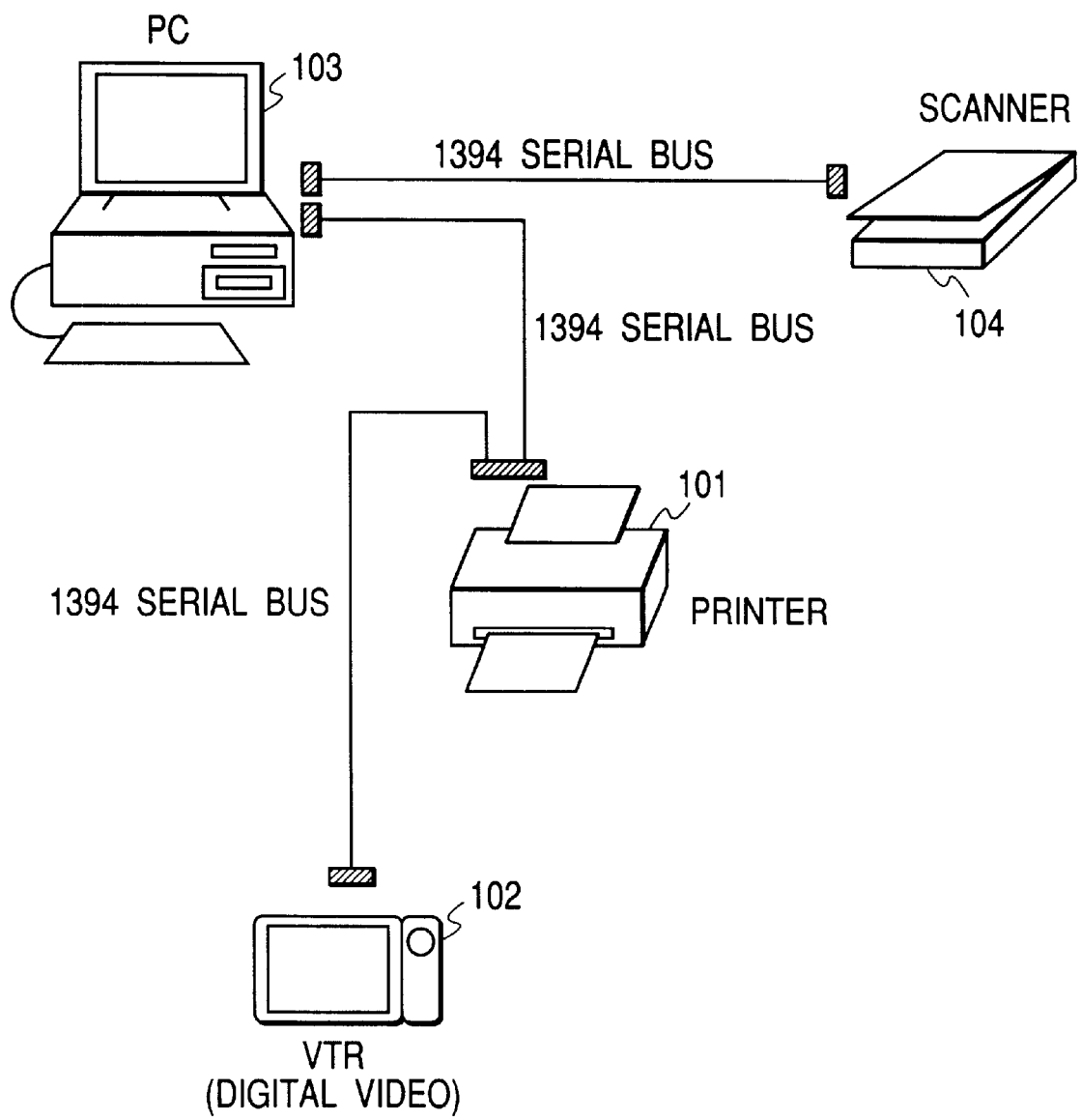
FIG. 2 is a diagram illustrating an example network for carrying out the present invention.
Figure 3:
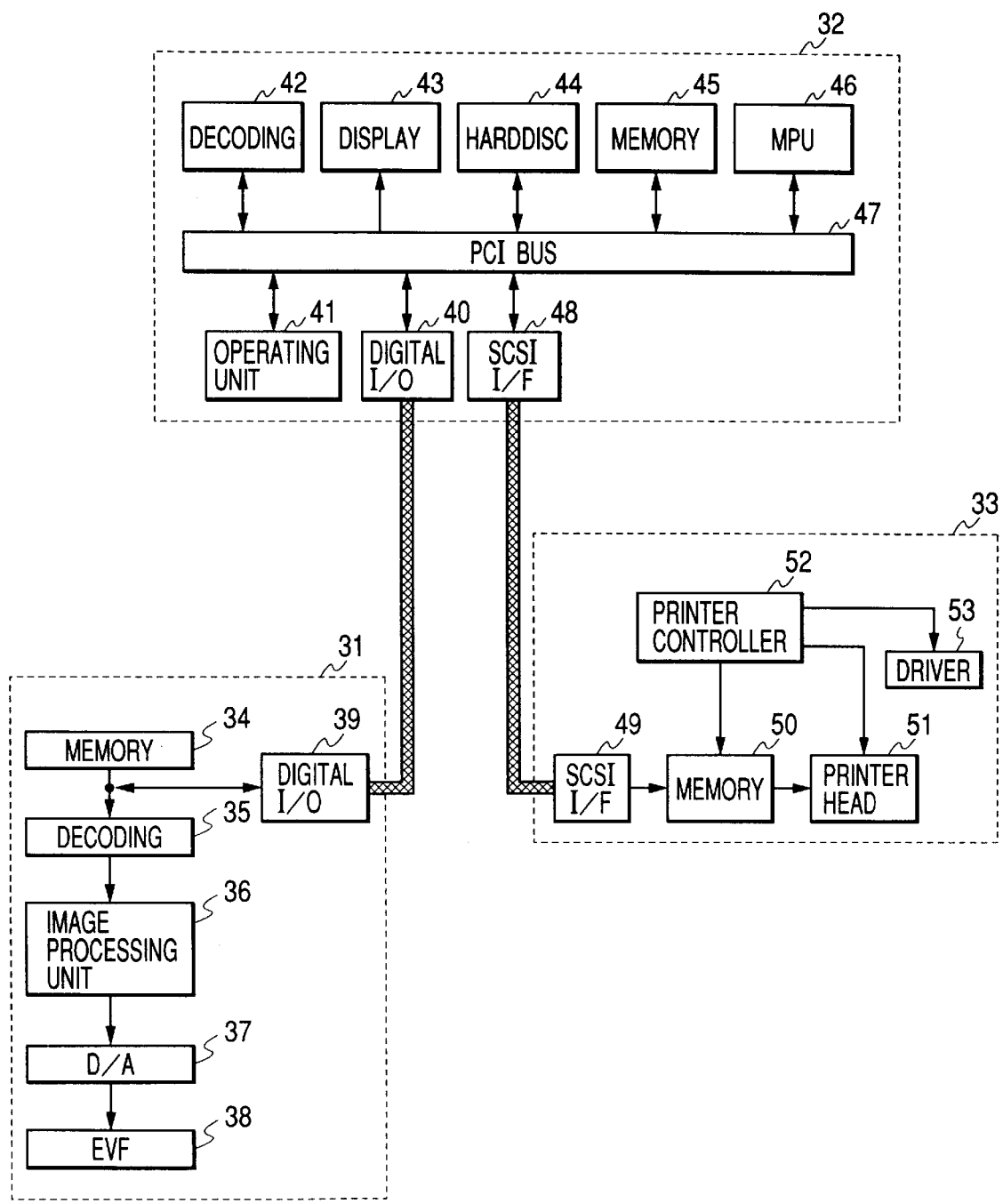
FIG. 3 is a block diagram illustrating how a conventional digital camera and a printer are connected to a PC.

In FIG. 2 is shown an example configuration of a network to carry out the present invention.

Since in this embodiment an IEEE 1394 serial bus is employed as a digital I/F for connecting the individual apparatuses, the IEEE 1394 serial bus will be described first.
<<Outline of the IEEE 1394 Standard>>

In consonance with the appearance of public digital VTRs and DVD players, support for the real-time transfer of large quantities of data, such as video data and audio data, came to be required. In order to transfer video data and audio data in real time and to fetch them for use by a personal computer (PC) or to transfer them to another digital apparatus, an interface was required having a function that enabled the fast transfer of data. To satisfy this need, the IEEE1394 -1995 standard for a bus (a High Performance Serial Bus, hereinafter referred to as a 1394 serial bus) was developed.

Figure 7:
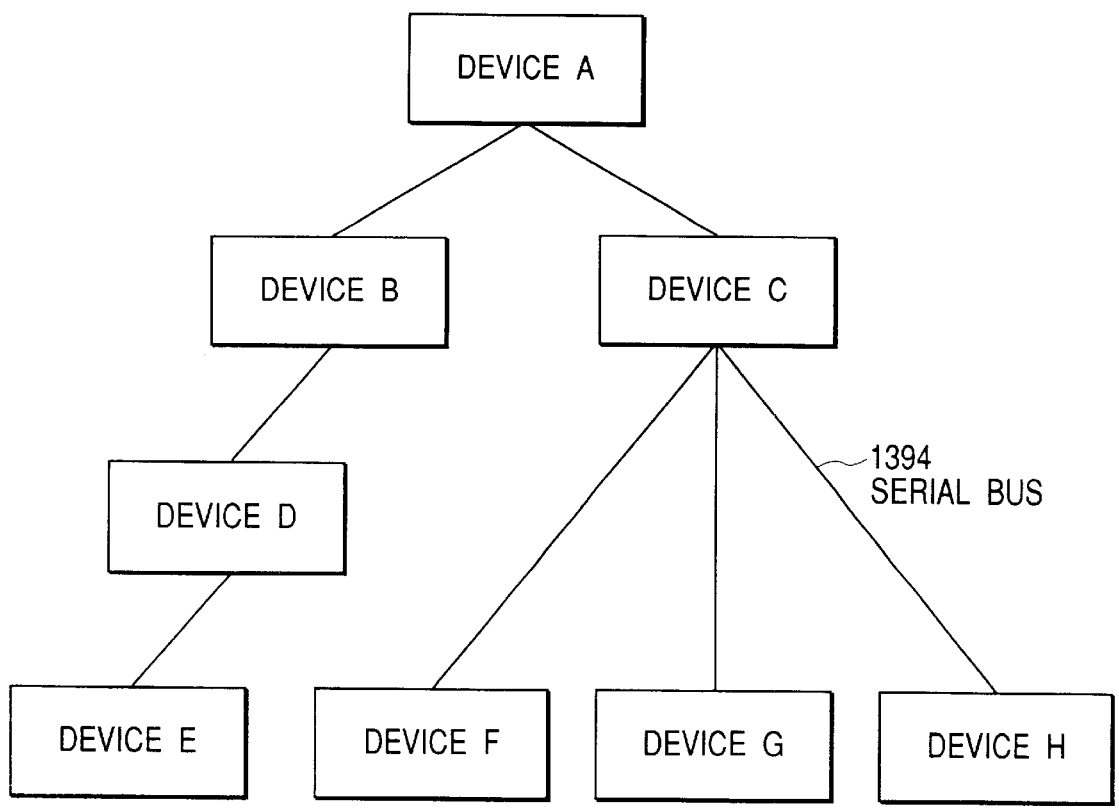
FIG. 7 is a diagram illustrating the configuration of a network whereon devices are connected by a 1394 serial bus.

In FIG. 7 is shown an example network system employing the 1394 serial bus. The system comprises devices A, B, C, D, E, F, G and H, and the devices A–B, B–D, D–E, C–F, C–G, and C–H are connected by twisted pair cables of the 1394 serial bus. The devices A to H are, for example, a personal computer, a digital VTR, a DVD, a digital camera, a hard disk, a monitor, a tuner and a monitor.

The configuration used for the connection of the individual devices can be a combination of the daisy chain and the node branching methods. This configuration provides a high degree of freedom when making connections.

Each of the devices has its inherent ID, and as the devices can recognize the others' IDs, they can constitute a single network within the range established for the 1394 serial bus by which they are connected. Only when the digital devices are connected by a single 1394 serial bus cable, the individual devices serve as relays, thereby constituting a single network. Each of the devices has a function for automatically identifying other devices and the states of their connections when the devices are connected by cable to the 1394 serial bus, and the Plug&Play function.

Further, when a device is removed from the network or a new device is added, the system shown in FIG. 7 automatically resets the bus and resets the network configuration, and thereafter builds a new network. With this function, the current configuration of the network can always be set and identified.

The data transfer speeds provided are 100/200/400 Mbps, and for compatibility, devices having higher transfer speeds support lower transfer speeds.

The data transfer modes are: an asynchronous transfer mode in which asynchronous data (hereinafter referred to as async data), such as control signals, are transferred; and an isochronous transfer mode in which isochronous data (hereinafter referred to as iso data), such as video data and audio data, are transferred in real time. After the transfer of a cycle start packet (CSP) indicating a cycle start, a mixture of async data and iso data is so transferred during a cycle (normally 125 $\mu$S) that the iso data are transferred before the async data.

Figure 8:
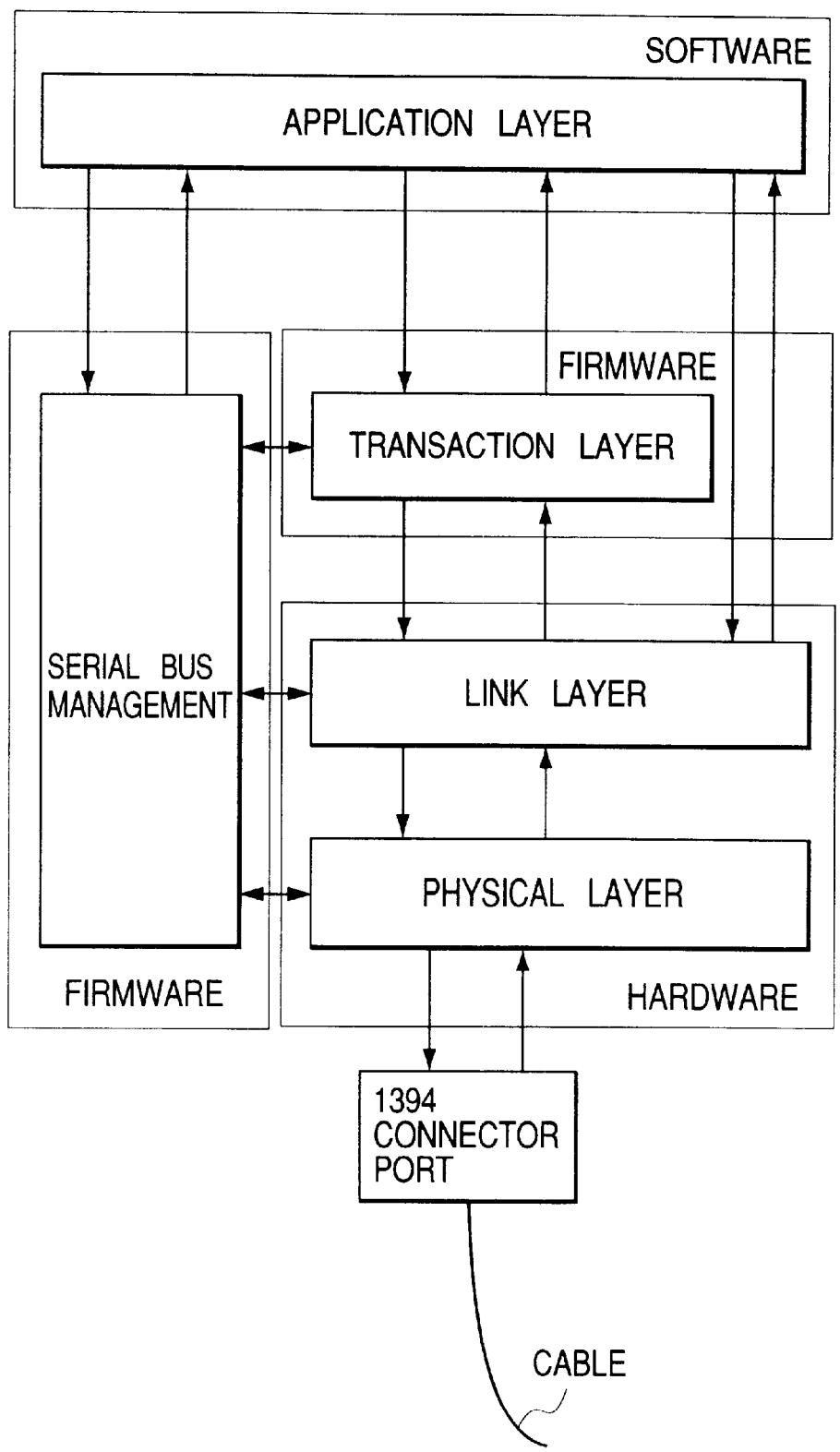
FIG. 8 is a diagram showing the components of a 1394 serial bus.

In FIG. 8 are shown the components of the 1394 serial bus.

The 1394 serial bus as a whole is constituted by layers. As is shown in FIG. 8, a 1394 serial bus cable is a substantial hardware component. A connector board is provided to which the cable and the connector for the 1394 serial bus are connected, and a hardware section comprising a physical layer and a link layer are positioned on it.

The hardware section is substantially an interface chip. The physical layer performs the coding and the control for connecters, and the link layer performs packet transfers and controls the cycle time.

The firmware transaction layer in the firmware section manages the data that are to be transferred (transactions) and issues Read, Write and Lock commands. The serial bus management layer manages the connection conditions for the connected devices, and their IDs, and also manages the configuration of the network.

The hardware and software sections substantially constitute the 1394 serial bus.

The configuration of the application layer in the software section differs depending on the software that is employed, and regulates the loading of data via the interface. A printer and the AVC protocol are specified.

This completes the explanation of the structure of the 1394 serial bus.

Figure 9:
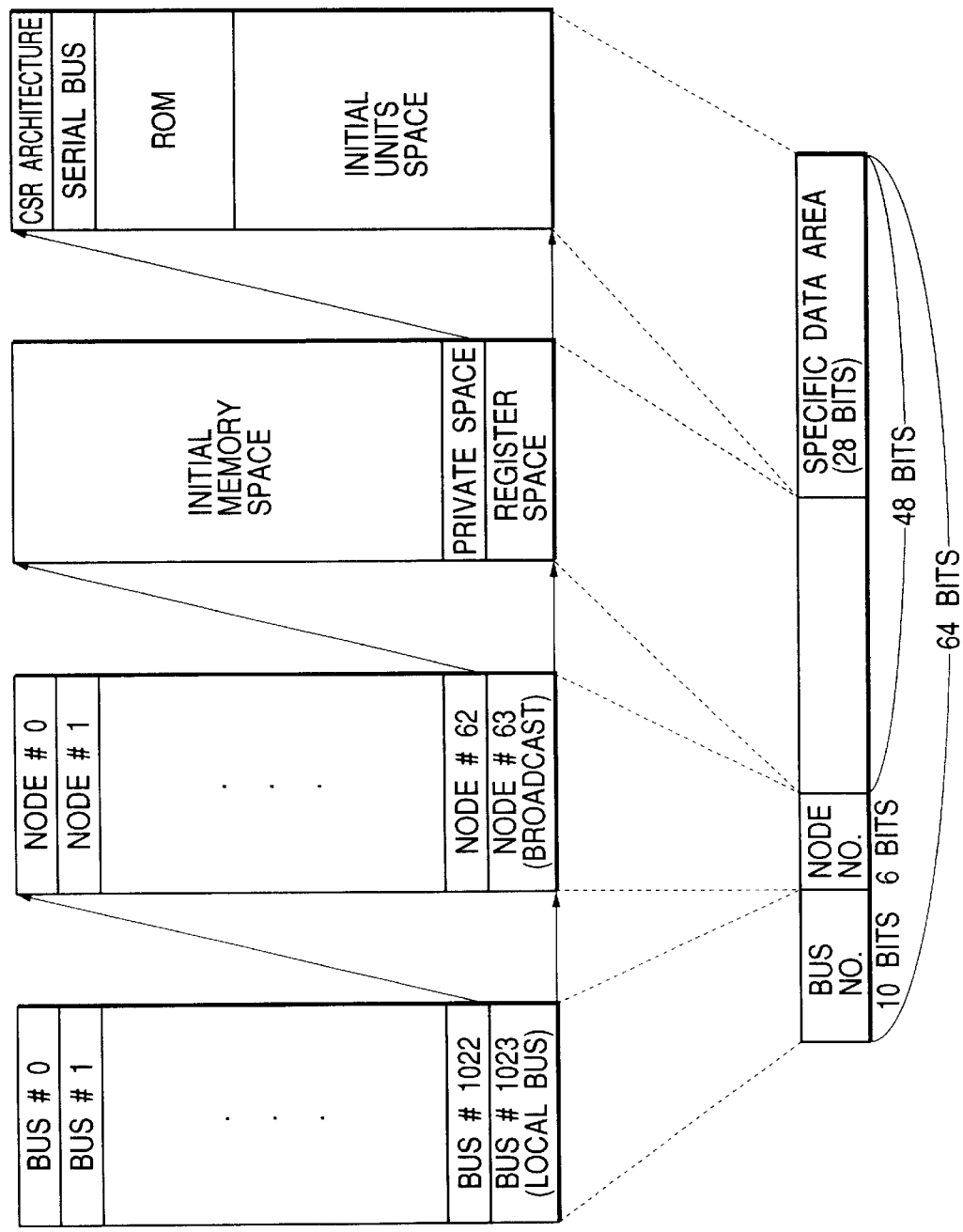
FIG. 9 is a diagram showing an address map for a 1394 serial bus.

The address space in the 1394 serial bus is shown in FIG. 9.

Inherent 64 bit addresses for individual devices (nodes) are provided for the devices connected to the 1394 serial bus. The addresses are stored in the ROM, so that a device's node address and the addresses of the other devices can always be identified, and so that communication with designated devices is possible.

The addressing method for the 1394 serial bus conforms to the IEEE 1212 standard, with the first ten bits being employed for the designation of a bus number and the following six bits being employed for the designation of a node ID number. The remaining 48 bits are used as an address width for a device, and can be used as an inherent address space. The last 28 bits are used as an inherent data region in which are stored data for the identification of the devices and for the designation of the devices' employment conditions.

This completes an outline of the way in which the 1394 serial bus is employed.

The technical characteristics of the 1394 serial bus will now be explained in detail.

<<Electric specifications for the 1394 serial bus>>

Figure 10:
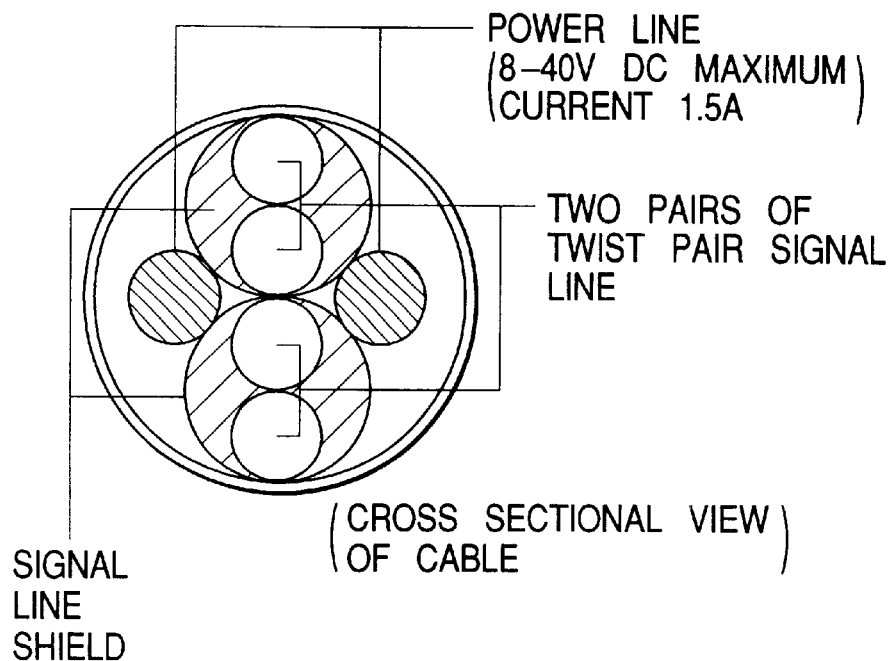
FIG. 10 is a cross-sectional view of a 1394 serial bus cable.

FIG. 10 is a cross-sectional view of a 1394 serial bus cable.

For the 1394 serial bus, six pins, i.e., two twisted pair signal lines and power source lines, are provided for a connection cable. With this structure, power can be supplied to devices having no power sources, and to devices whereat voltage drops have occurred as a result of malfunctions.

The voltage of the current flowing along the power source line is specified at 8 to 40 V, and a maximum DC current of DC 1.5 A is specified.

<<DS-Link coding>>

Figure 11:
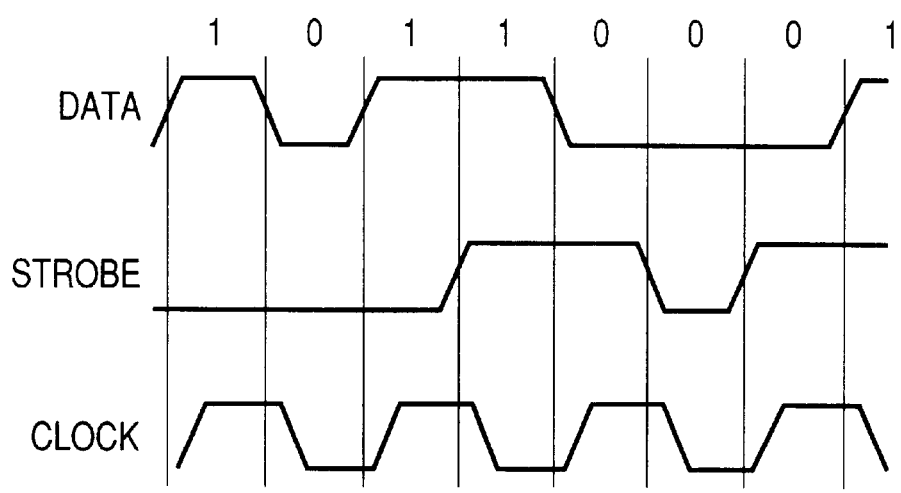
FIG. 11 is a diagram for explaining the DS-Link coding method.

FIG. 11 is a diagram for explaining the DS-Link coding method for a data transfer format that is employed for the 1394 serial bus.

The DS-Link (Data/Strobe Link) coding method is employed for the 1394 serial bus. The DS-Link coding method is appropriate for fast serial data communication, and requires the use of two signal lines. Primary data are transmitted along one of the paired signal lines, and strobe signals are transmitted along the other signal line.

The receiving side exclusive ORs the received data and the strobe signal to reproduce a clock.

The reasons that the DS-Link coding method is employed are: its transfer efficiency is higher than the transfer efficiency of any other serial bus data transfer method; a PLL circuit is not required and the circuit scale for a controller LSI can be reduced; and, since when there is no data to be transferred it is not necessary to send an idling state signal, the transceiver circuits of individual devices can be set to the sleeping state and the consumption of power can be reduced.

<<Bus reset sequence>>

The 1394 serial bus is so controlled that a node ID can be provided for each connected device (node) in order to identify the network configuration.

When the network configuration is changed, for example, by an increase or decrease in the number of nodes, which is caused by the insertion or removal of a node or by the turning on or off of the power source, and a new network configuration must be identified, the nodes that detect the change transmit a bus reset signal to the bus and enter the mode for the identification of a new network configuration. The detection of the change is performed by detecting a change in a bias voltage at a 1394 port substrate.

When a specific node has transmitted a bus reset signal, the physical layers of the individual nodes receive the bus reset signal, and at the same time, notify the link layers of the occurrence of the bus reset and transmit the bus reset signal to the other nodes. When all the nodes have detected the bus reset signal, resetting of the bus is initiated.

The resetting of the bus is initiated either by the insertion or the removal of the cable or by the detection of a network hardware abnormality, or by a command being issued directly to the physical layer under the control of the host, as is provided for by the protocol.

Further, when the bus reset is initiated, the data transfer process is temporarily halted and is set to the wait state. Subsequently, the transfer of data is resumed when the acquisition of a new network configuration has been completed.

This completes the explanation for the bus reset sequence.

<<Node ID designation sequence>>

After the bus reset is completed, the processing is performed for providing an ID for each node in order to construct a new network configuration. The general sequence of the processing performed from the time the bus is reset until the decisions concerning the node IDs are made will now be described while referring to flowcharts in FIGS. 19, 20 and 21.

Figure 19:
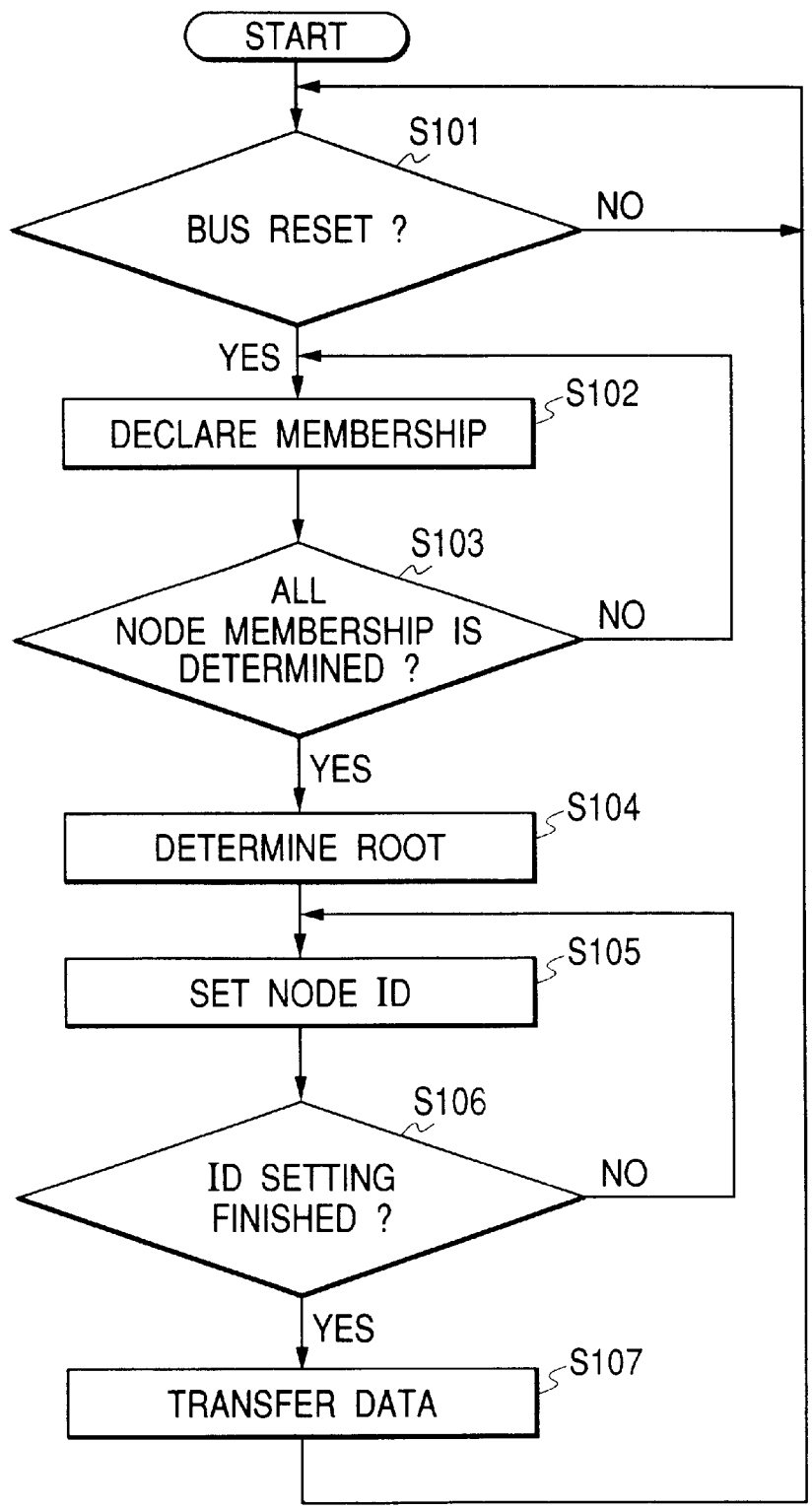
FIG. 19 is a flowchart showing the processing performed from the time a bus is reset to the time a node ID is set.

In the flowchart in FIG. 19 is shown the sequential bus processing performed from the time the bus reset was initiated until the node ID decisions have been completed and the transfer of data can be resumed.

First, at step S101 the network is constantly monitored in order to detect the occurrence of a reset. When a bus reset occurs due to the powering on or off of the node, program control advances to step S102.

At step S102 parental relationships are declared for nodes that are directly connected in order to obtain the connection condition for a new network. When, at step S103, it is found that the parental relationships of all the nodes have been determined, at step S104 a root is determined. Until the parental relationships of all the nodes are determined, the declaration of the parental relationships at step S102 is repeated and no root is determined.

If, at step S104, the root is determined, at step Sl05 a node ID is set to provide an ID for each node. A predetermined node order is employed for setting the node IDs, and the setting process is repeated until IDs are provided for all the nodes. Finally, when at step S106 it is found that IDs have been established for all the nodes, it is assumed that together the nodes identify a new network configuration. At this time the transfer of data between the nodes can be resumed and at step S107 it is initiated.

In the condition at step S107, the operation again enters the mode for the monitoring performed to detect the occurrence of a bus reset. When a bus reset occurs, the setting process at steps S101 to S106 is repeated.

Figure 20:
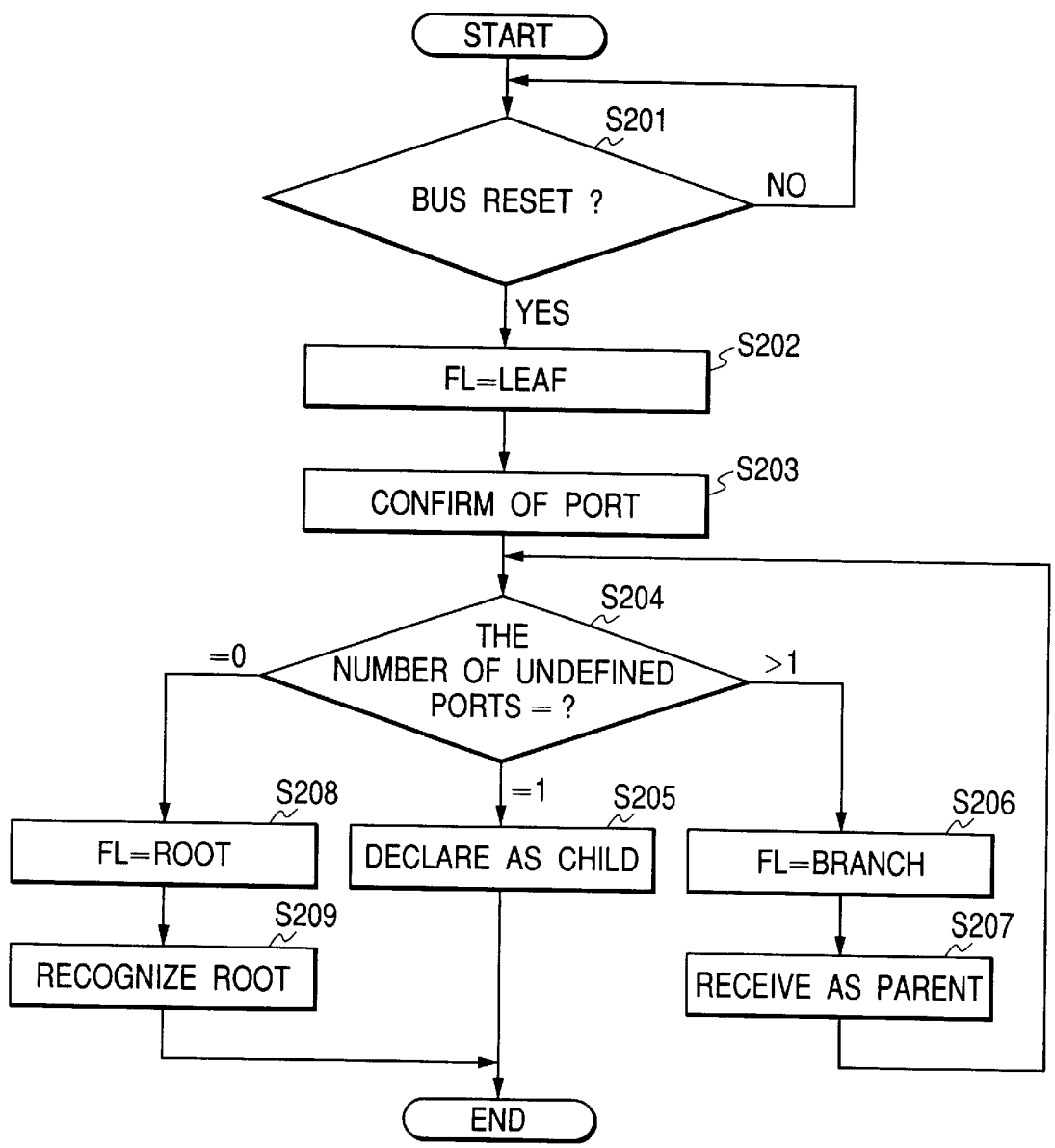
FIG. 20 is a flowchart for explaining a process for obtaining a decision relative to a parental relationship when the bus is reset.
Figure 21:
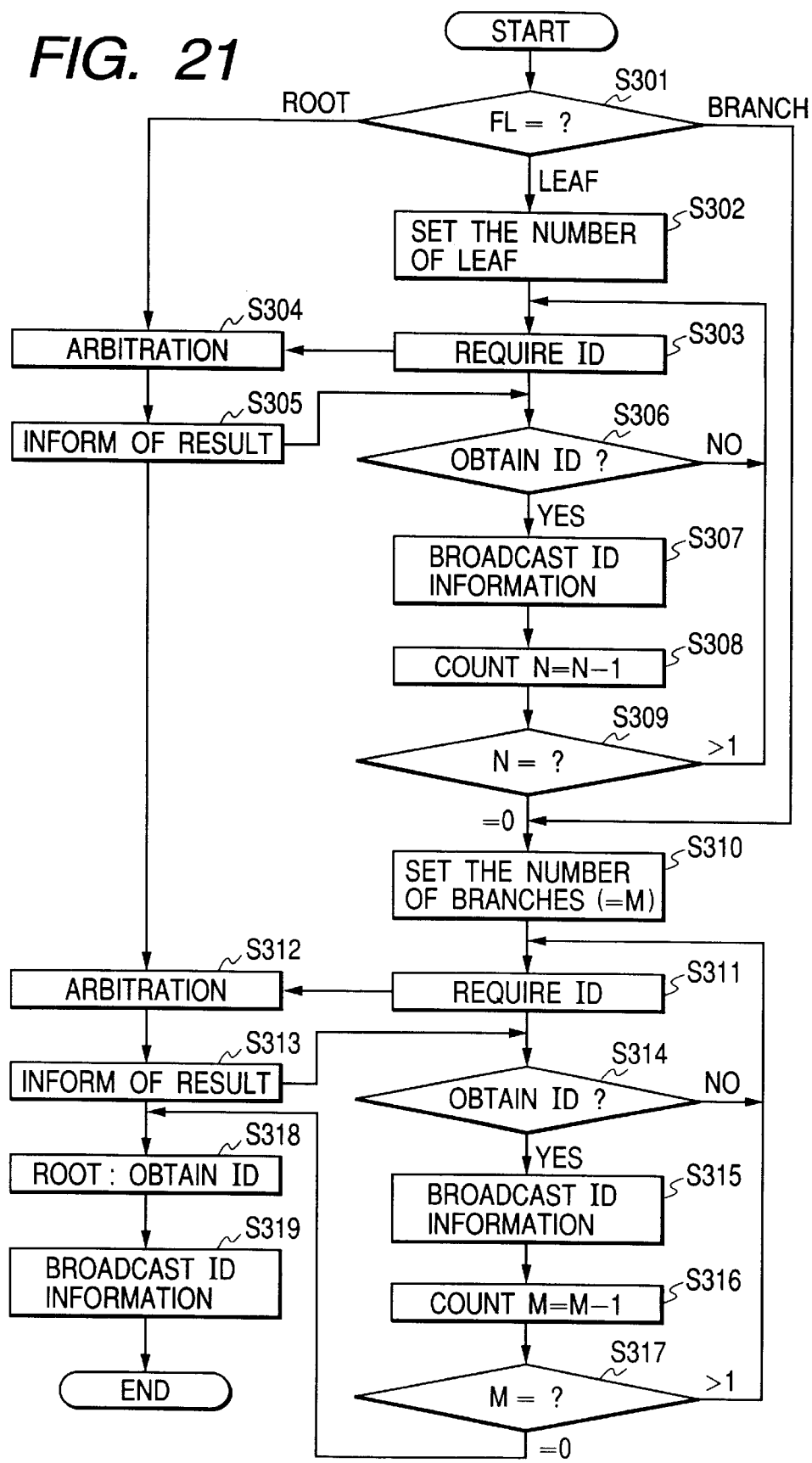
FIG. 21 is a flowchart for explaining a process performed from the time the decision for the parental relationship is obtained, when the bus is rest, to the time the individual node IDs are determined.

This completes the explanation for the processing performed according to the flowchart in FIG. 19. In FIGS. 20 and 21 are detailed flowcharts for the processing in FIG. 19 performed from the time the bus is reset until the root has been determined, and performed from the time the root is determined until the ID setting has been completed.

First, the processing performed in the flowchart in FIG. 20 will be explained.

When a bus reset occurs at step S201, the network configuration is temporarily reset. It should be noted that at step S201 constant monitoring is performed to detect the occurrence of a bus reset.

At step S202 a flag representing a leaf (node) is set for individual devices as the first stage of the process for again identifying the connection condition of the reset network. At step S203 the individual devices perform a confirmation process for their ports to determine how many other nodes are connected to them.

In accordance with the number of ports obtained as a result of the configuration process, at step S204 the count of the undefined ports (for which no parental relationships have been determined) is examined in order to initiate the declaration of the parental relationships. While the number of ports is equal to the number of undefined ports immediately after the bus is reset, the number of undefined ports detected at step S204 changes as the parental relationships are determined.

First, immediately after the bus reset, only a leaf can declare a parental relationship. Whether a node is a leaf or not can be determined by performing the confirmation process at step S203 for ascertaining the number of ports. When at step S205 a leaf declares that "I am a child and the other is a parent," relative to a node connected to the leaf, the processing is thereafter terminated.

For a node that is identified at step S203 as being a branch having a plurality of ports, at step S204 the number of undefined ports >1 is determined immediately after the bus is reset. Program control therefore moves to step S206, whereat a flag representing the branch is set, and to step S207, whereat the branch waits for the receipt of a "parent" designation after the leaf declares the parental relationship.

Once the leaf declares the parental relationship, upon the receipt of the declaration at step S207 the branch confirms the count of the undefined ports at step S204. When the number of undefined ports is 1, the declaration "I am a child" at step S205 can be made for a node that is connected to the remaining port. The second and subsequent times, at step S207 a branch that has two or more undefined ports that are confirmed at step S204 waits for the receipt of a "parent" designation from a leaf or another branch.

Finally, when one of the branches, or exceptionally, a leaf (because it did not act quickly enough, even though it could declare itself a child), has no undefined ports at step S204, it is assumed that the declaration of the parental relationship for the entire network has been completed. At step S208 a root flag is set to represent only one node that has no undefined port (all the ports are determined to be parent ports), and at step S209 the node is identified as the root.

The processing performed from the time the bus is reset in FIG. 20 until the declaration of the parental relationship has been completed for all the nodes in the network is thus terminated.

The processing shown in the flowchart in FIG. 21 will now be described.

Since during the sequence in FIG. 21 flag information is set for the nodes that are leaves, branches and root, this information can be employed at step S301 to sort the nodes.

In the job for providing the IDs for the individual nodes, the setting of the ID begins at the leaves. The ID is set first for the leaf, then for the branch, finally for the root, in ascending order (node numbers =0, . . . ).

At step S302 the number N (N is a natural number) of leaves that are present in the network is set. At step S303 the individual leaves submit requests to the root for IDs. When a plurality of these requests are submitted, at step S304 the root functions as an arbitrator. Therefore, at step S305 an ID number is given to the node that won, and a notice of failure is transmitted to the node that lost. At step S306 the leaf that failed to acquire an ID again issues an ID request, and the same process is repeated. At step S307 a leaf that has acquired an ID broadcasts the ID information for the node to all the other nodes. When a node has broadcast its ID information, at step S308 the count of the remaining leaves is decremented by one. When, at step S309, the count of the remaining leaves is equal to or greater than 1, the process performed at the ID requesting step S303 and at the following steps is repeated. When all the leaves have broadcast their ID information, at step S309 N=0, and program control thereafter moves to the ID setting for branches.

The ID setting for branches is performed in the same manner as is the ID setting for leaves.

First, at step S310 the number M (M is a natural number) of branches that are present in the network is set. At step S311 the individual branches submit requests to the root for IDs. At step S312 the root functions as an arbitrator, and provides numbers in ascending order, beginning at the number following the last number given to the leaves, for the branches, beginning with the branch that won. At step S313 the root transmits ID information or a notice of failure to acquire an ID to the branches that submitted the ID requests. At step S314 the branches that failed to acquire IDs again submit ID requests, and the same process is repeated. At step S315 a branch that has acquired an ID broadcasts its node ID information to all the other nodes. When a node has broadcast its ID information, at step S316 the count of the remaining branches is decremented by one. When, at step S317, one or more branches remain, the process beginning at step S311, for requesting an ID, is repeated until all the branches have broadcast their ID information. When all the branches have acquired their node IDs, at step S317 M=0. The ID acquisition mode for the branches is thereafter terminated.

When this process is completed, only the root has not acquired the ID information. Then, at step S318 the smallest number of the unused numbers is designated as the ID number for the root, and at step S319 the ID information for the root is broadcast.

As is shown in FIG. 21, the processing performed from the time the parental relationships are determined until the IDs of all the nodes are set is thereafter terminated.

An example operation performed in the actual network shown in FIG. 12 will now be described while referring to FIG. 12.

Figure 12:
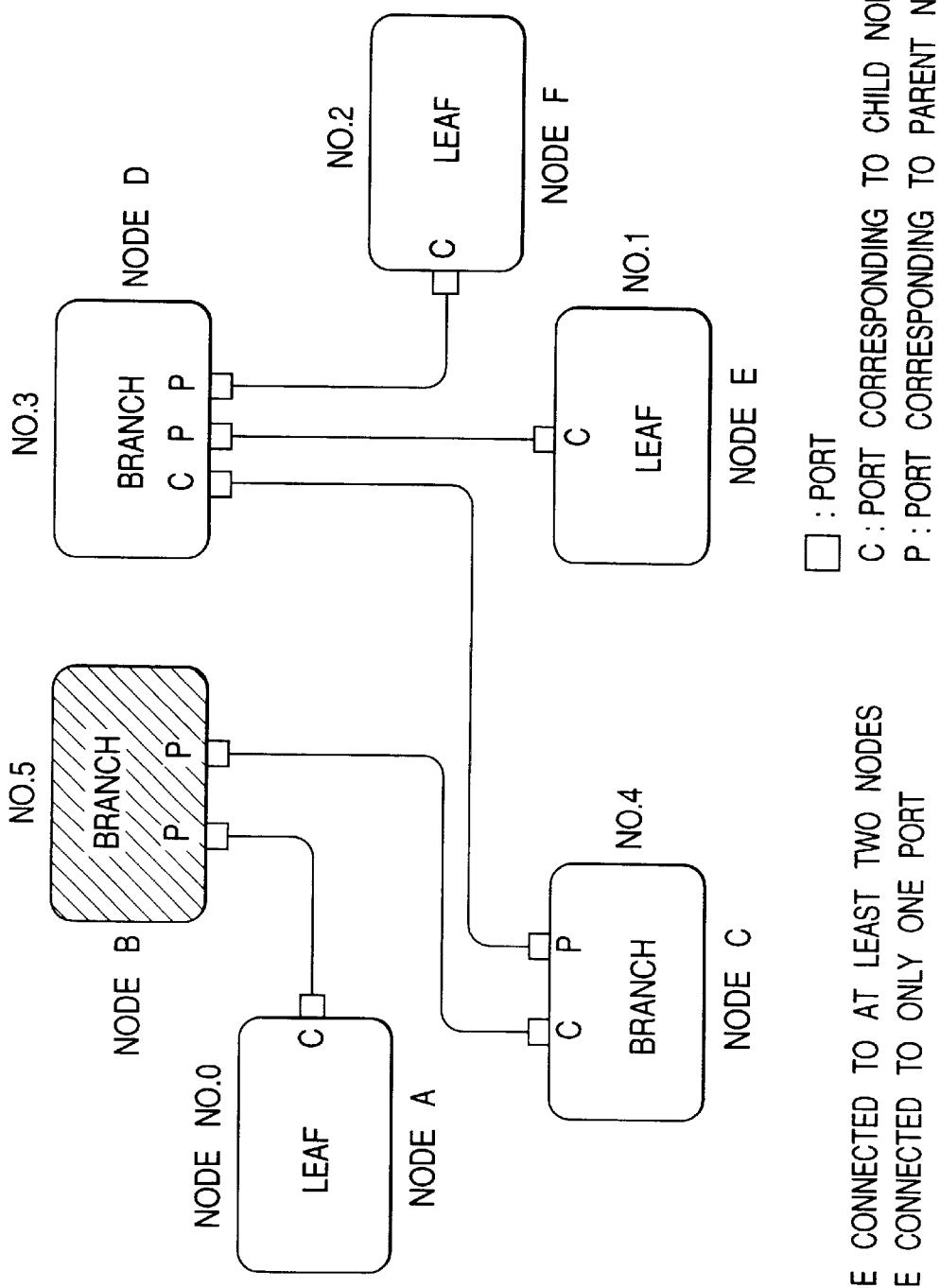
FIG. 12 is a diagram for explaining a topology setup used to determine the IDs of individual nodes along a 1394 serial bus.

In FIG. 12, node A and node C are connected directly to a lower level of node B (root), node D is connected directly to a lower level of node C, and node E and node F are connected directly to a lower level of node D to constitute a hierarchial structure. The hierarchial structure, and the processing for determining the root, the node and node IDs will now be described.

When the bus has been reset, first, parental relationships are declared for the ports at which nodes are directly connected together, in order to confirm the connection condition of the nodes. According to the parental relationship, a parent is located at a higher level in the hierarchial structure, and a child is located at a lower level.

In FIG. 12, node A is the first to declare its parental relationship after the bus has been reset. Generally, a node (called a leaf) that has a connection at only one port can declare the parental relationship. Since such a node is the first to understand that it has a connection at only one port, the node realizes it is at the end of the network, and the parental relationship is determined for a node that reacts quickly enough. The port of a node (node A for nodes A–B) that has declared the parental relationship is determined to be a child, and the port of the other node (node B) is determined to be a parent. As a result, the parental relationship between nodes A–B is determined to be a child-parent relationship; the relationship between nodes E–D is determined to be a child-parent relationship; and the relationship between nodes F–D is determined to be a child-parent relationship.

At a layer one level higher, nodes (called branches) having a plurality of connection ports declare their parental relationships in the ascending order, beginning at a node that receives a declaration of a parental relationship from another node. In FIG. 12, after the parental relationships between nodes D–E and between nodes D–F have been established, first node D declares its parental relationship to node C, and as a result, nodes D–C are determined to have a child-parent relationship.

Upon receipt of the declaration of the parental relationship from node D, node C declares its parental relationship to node B, which is connected to its other port. As a result, the nodes C–B have a child-parent relationship.

In this manner, the hierarchial structure shown in FIG. 12 is established, and node B, which serves as a parent for all the connected nodes, is determined to be the root node. Only one root is present in the network configuration.

In FIG. 12 node B is determined to be the root node; however, if node B, which has received from node A a declaration of the parental relationship, declares the parental relationship to another node at an early time, the other node may serve as the root node. In other words, any of the nodes can be the root node, depending on the timing of the transmission of a declaration, and the root node is not always a constant, even in the same network configuration.

When the root node is determined, the operation enters the mode for determining the individual node IDs. In this mode, all the nodes notify the other nodes of their personal node IDs (broadcast function).

The ID data for an individual node includes a node number, information concerning connection positions, the number of ports the node has, the number of ports currently being used for connections, and information concerning the parental relationship for each port.

The assignment of the node ID numbers begins with a node (a leaf) that has only one port connected to another node, and node numbers=0, 1, 2, . . . are assigned in the ascending order.

A node that obtains a node ID broadcasts the information, including the node number to the other individual nodes. In this manner, it is confirmed that an ID number has been assigned.

When all the leaves have acquired node IDs, the assignment process for branches is initiated, and node ID numbers following those used for the leaves are sequentially assigned to the individual nodes. As was done by the leaves, the branches that obtain node ID numbers broadcast their node ID information, and at the last the root node broadcasts its ID information. In other words, the root always possesses the highest node ID number.

After the assignment of node IDs for the entire hierarchial structure has been completed, the network configuration is rebuilt, and the initialization process for the bus is terminated.

<<Arbitration>>

For the 1394 serial bus, arbitration of the right to use the bus is always performed prior to a data transfer. Since the 1394 serial bus is a logical bus network wherein the individual connected devices relay received signals so that signals are transmitted to all the devices in the network, arbitration is necessary in order to prevent packet conflicts. As the result of the arbitration, only one node can transfer data during a specific time.

Figure 13B:
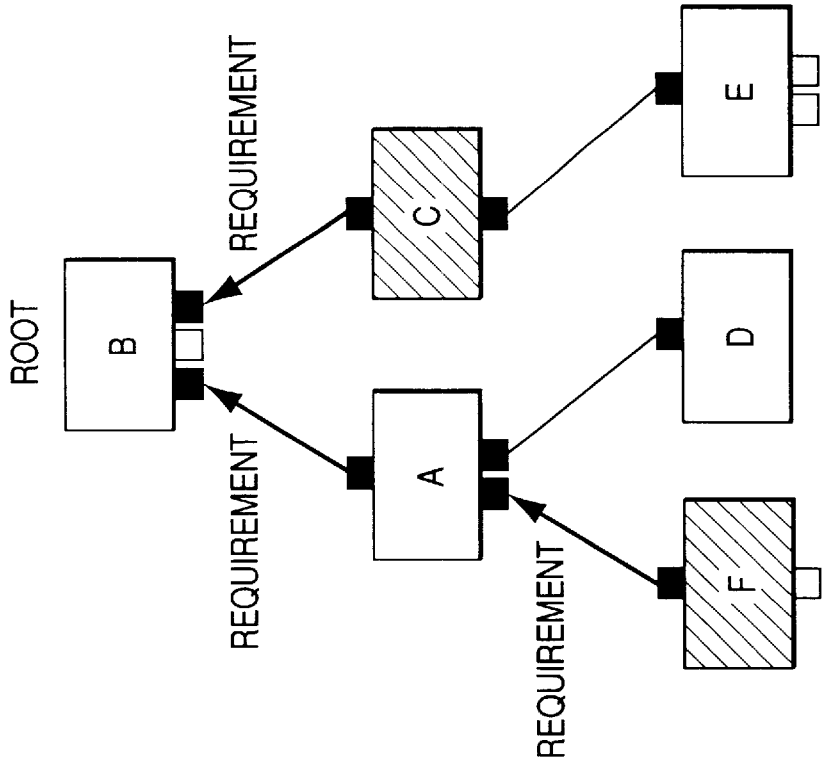
FIGS. 13A and 13B are diagrams for explaining an arbitration process using a 1394 serial bus.
Figure 13A:
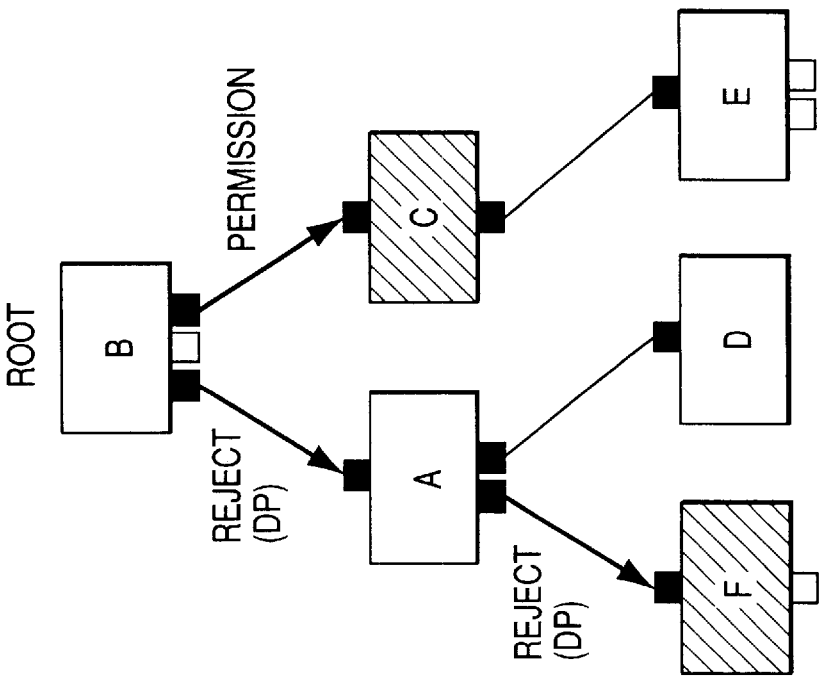

FIGS. 13A and 13B are diagrams of the procedure followed when use of the bus is required, and the arbitration process will now be described while referring to these Figures.

Arbitration is initiated when one or more nodes issue to their parent nodes requests for employment of the bus. In FIG. 13A, node C and node F issue requests for the employment of the bus. Upon receipt of the request from node C, their parent node (node A in FIG. 13) issues (relays) to its parent node a request for employment of the bus. Thus, the request is finally transmitted to the root that performs the arbitration process.

The root node, which has received the requests for the use of the bus, determines which node shall be permitted to use the bus. Only the root node can perform the arbitration process, and award permission to use the bus to the wining node. In FIG. 13B, permission to use the bus is awarded to node C and the request from node F is rejected. Thereafter, a DP (Data Prefix) packet is transmitted to the node that lost to notify it that its request was rejected. The node request for the use of the bus that was rejected is held until the next arbitration process is performed.

The node that won in the arbitration process and is permitted to use the bus can begin the transfer of data.

The sequential steps involved in the arbitration process will now be explained while referring to the flowchart in FIG. 22.

The bus must be idle for a node to initiate a data transfer. When a predetermined idle time gap length (e.g., a sub-action gap), which is set for each transfer mode, has elapsed, the node confirms that a preceding data transfer has been terminated and that the bus is currently not being used, and thus determines that it can begin the transfer of data.

At step S401, a check is performed to determine whether or not a predetermined gap length that corresponds to data to be transferred, such as async data or iso data, can be acquired. Since a request for use of the bus, which is required to initiate a data transfer, can not be issued unless a predetermined gap length is obtained, the node waits until the predetermined gap length is available.

When at step S401 an adequate gap length is obtained, at step S402 a check is performed to determine whether there is data to be transferred. If there is data to be transferred, at step S403 a request for use of the bus is issued to the root in order to obtain use of the bus to transfer data. As is shown in FIG. 13, a signal indicating that use of the bus is requested is relayed by the network devices until it is finally transmitted to the root. When, however, at step S402 there is no data to be transferred, the node enters the standby state.

When, at step S404, the root receives one or more requests issued at step S403 for the use of the bus, at step S405 the root examines the count of the nodes that have issued usage requests. If the node count=1 at step S405 (one node issued a request for bus use), permission for the use of the bus is immediately awarded to the node. If the node count>1 at step S405 (a plurality of nodes issued requests), at step S406 the root performs an arbitration process to determine which node should be permitted to use the bus. This arbitration process is fair, and permission to use the bus is not always awarded to the same node, but rather is distributed equally.

At step S407, of the nodes that issued the use requests that were the subjects of the arbitration process performed by the root at step S406, the node that was awarded permission to use the bus is separated from the other nodes that lost. At step S408 the root transmits a permission signal to the node that was granted permission to use the bus as the result of the arbitration process, or to the node that was granted permission without the arbitration process being required because the count of the nodes requesting to use the bus was 1 at step S405. Upon the receipt of the permission signal, the subject node immediately begins to transfer data (as packets). At step S409 the root transmits a DP (Data Prefix) packet, which indicates an arbitration process loss, to the nodes that lost as the result of the arbitration process performed at step S406 and are not permitted to use the bus. Upon the receipt of the DP packet, the nodes return to step S401 in order to again issue requests for the use of the bus for the transfer of data, and wait until predetermined gap lengths are available.

Figure 22:
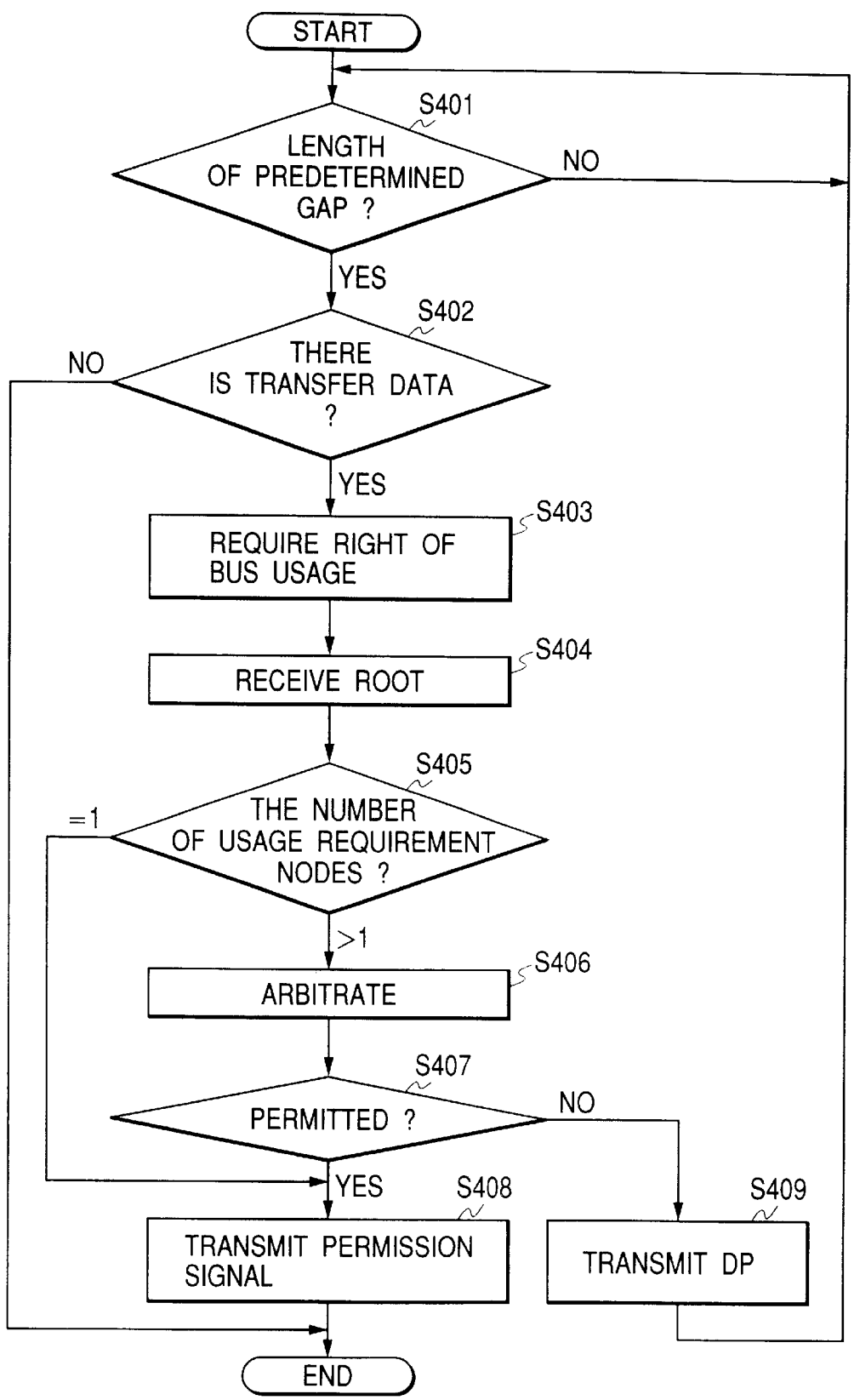
FIG. 22 is a flowchart for the arbitration process.

The arbitration process has been explained while referring to the flowchart in FIG. 22.

<<Asynchronous transfer>>

Figure 14:
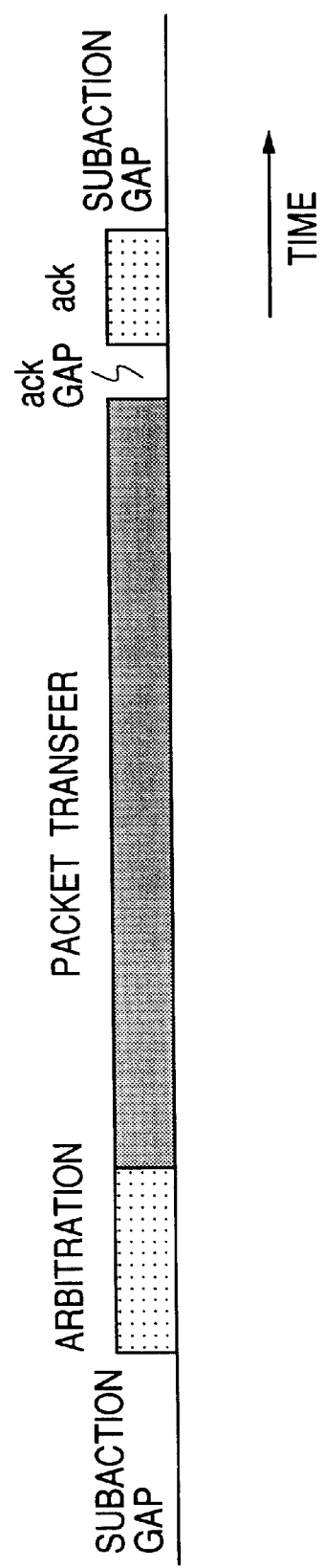
FIG. 14 is a diagram showing a fundamental structure that represents the time coordinated shifting of an asynchronous transfer state.

In FIG. 14 is shown the time-shift state in the asynchronous transfer process. The first sub-action gap in FIG. 14 indicates a bus idle state. When the idle time becomes a constant value, the node that desires a data transfer judges that the bus can be used, and engages in the arbitration process to acquire use of the bus.

When as the result of the arbitration process the node is granted permission to use the bus, the node begins the transfer of data as a packet. Upon the receipt of data, a node returns either a reception result ack (acknowledgement return code) or a response packet after a short ack gap has elapsed. Then, the transfer is completed. The code ack, which consists of four data bits and four checksum bits, includes information indicating whether a transfer was successful, or a busy state or a pending state, and is immediately returned to the transmission source node.

Figure 15:
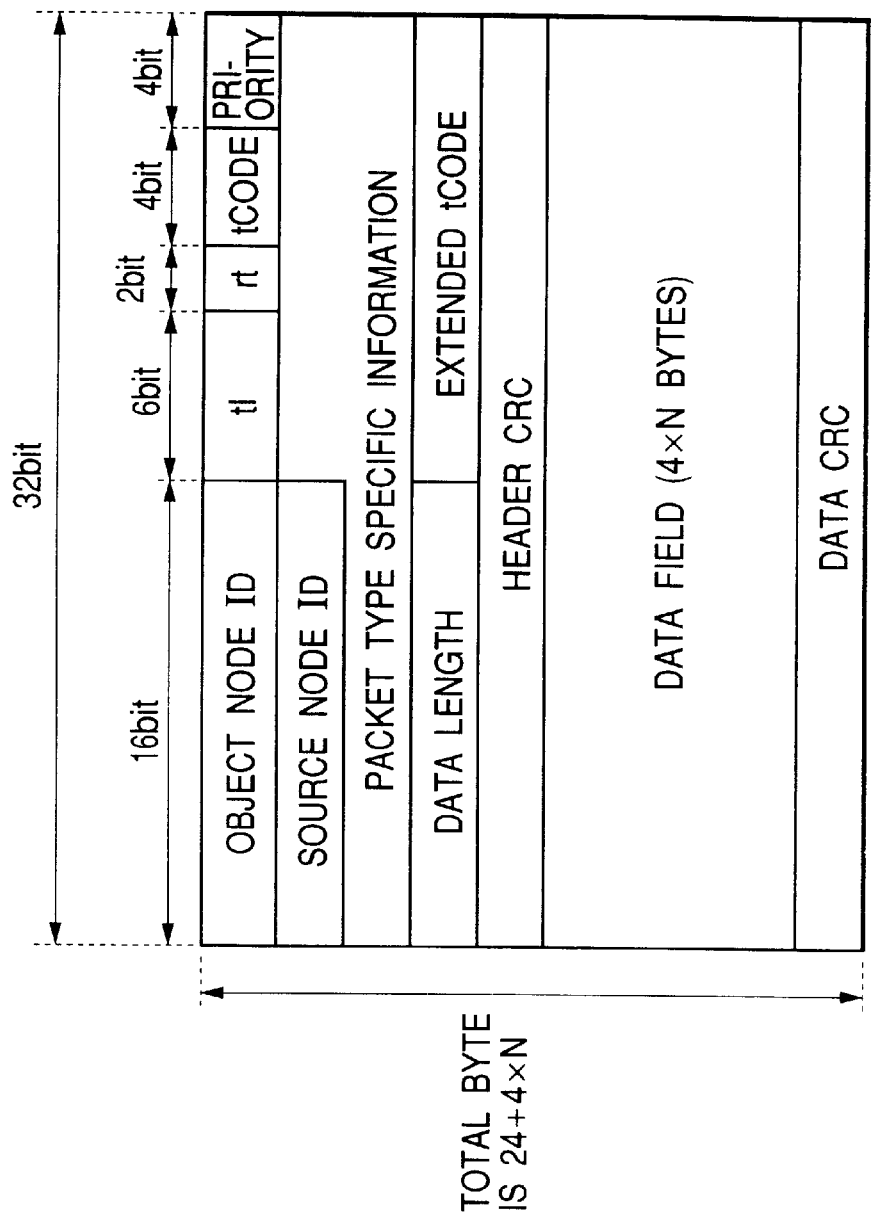
FIG. 15 is a diagram showing an example format for an asynchronous transfer packet.

An example packet format for an asynchronous transfer is shown in FIG. 15. The packet consists of a data portion, error correction CRC data and a header portion in which are entered an object node ID, a source node ID, the length of data to be transferred and various types of code, as is shown in FIG. 15.

An asynchronous transfer is a one-to-one communication between a specific node and another node. A packet from a transmission source node is transmitted to all the nodes in a network; however, since all nodes ignore packets that are addressed to other nodes, only the addressed node can read the packet.

This completes the description of the asynchronous transfer of data.

<<Isochronous transfer>>

An isochronous transfer is a synchronous transfer, which is the most distinctive feature of the 1394 serial bus and makes it appropriate for the transfer of multimedia data, such as video data and audio data, for which real-time data transfer is required.

While an asynchronous transfer is a one-to-one communication procedure, when an isochronous transfer is performed data from one transmission source node are uniformly transmitted to all the other nodes.

Figure 16:
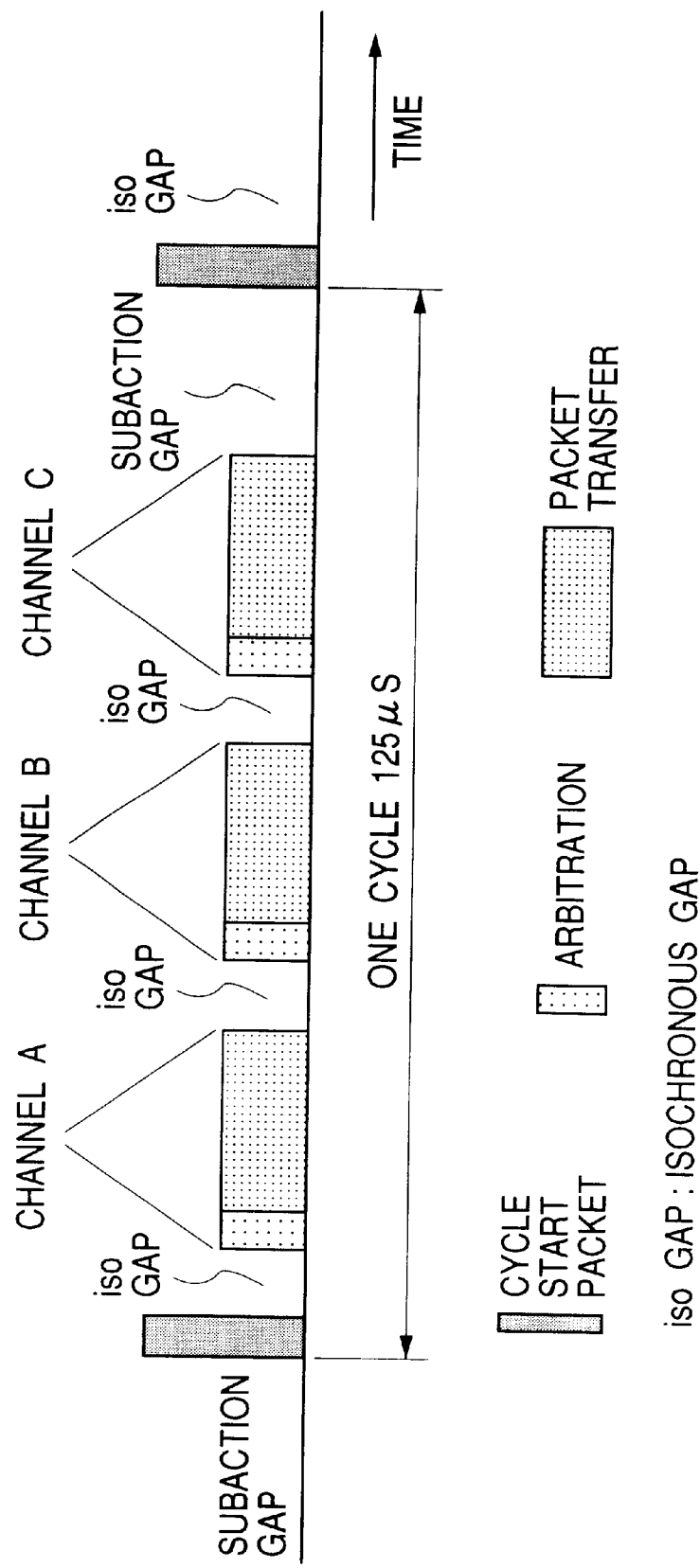
FIG. 16 is a diagram showing a fundamental structure that represents the time coordinated shifting of an isochronous transfer state.

FIG. 16 is a diagram showing the time-shift state for an isochronous transfer.

An isochronous transfer is performed over a bus at a constant time interval. This time interval is called an isochronous cycle, which is 125 $\mu$S. A cycle start packet serves as an indicator for each cycle start time and adjusts the time for the nodes. A node called a cycle master transmits the cycle start packet. When a predetermined period of time (a sub-action gap) has elapsed following the completion of an immediately preceding transfer cycle, the cycle start packet indicating the start of a current cycle is transmitted. The time interval at which the cycle start packet is output is 125 $\mu$S.

Further, since channel IDs, such as channel A, channel B and channel C shown in FIG. 16, are provided for a plurality of types of packets in one cycle, the packets can be identified during transmission. As a result, simultaneous, real-time transfer of data between nodes is possible, and a reception node need only fetch data selected in accordance with a channel ID. In this case, the channel ID does not represent the address of the transmission source, but merely provides a logical number relative to data. Therefore, a specific packet can be broadcast by one transmission source node to all the other nodes.

Before the isochronous transfer of a packet, arbitration is performed, as it is for an asynchronous transfer. Since unlike an asynchronous transfer an isochronous transfer is not a one-to-one communication procedure, the ack code (reception acknowledgement return code) is not present for an isochronous transfer.

The iso gap (isochronous gap) in FIG. 16 represents an idle time period that is required to confirm a bus is not being used before an isochronous transfer is performed. When the predetermined idle period has elapsed, a node that desires to perform an isochronous transfer will determine when the bus is not being used, and will perform arbitration before the transfer.

Figure 17:
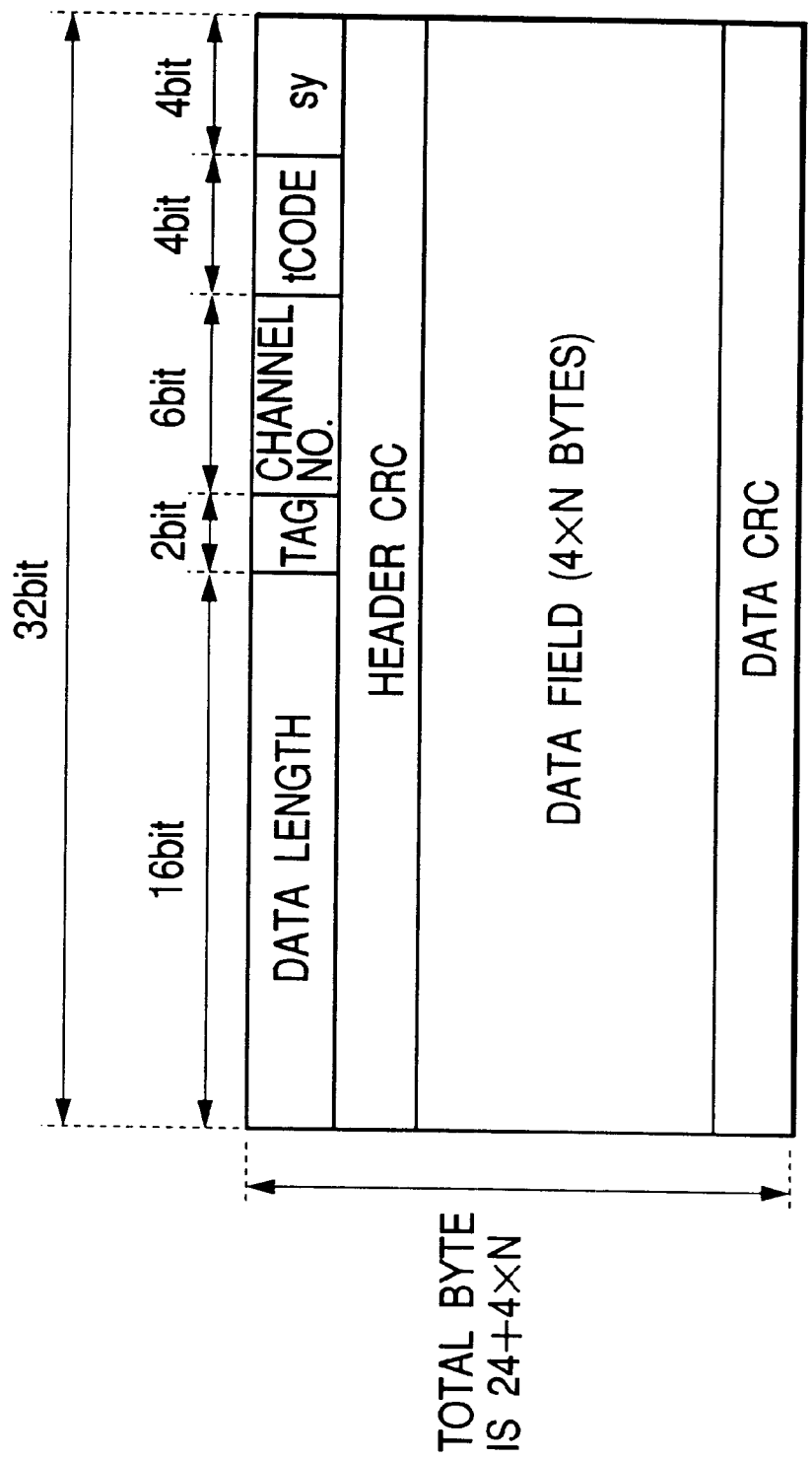
FIG. 17 is a diagram showing an example format for an isochronous transfer packet.

An example packet format for an isochronous transfer will now be explained while referring to FIG. 17.

Each of the packets sorted for individual channels includes a data portion, error correction CRC data and a header portion in which are written the length of the data that are to be transferred, a channel No., various types of code and an error correction header CRC.

This completes the explanation for the isochronous transfer of data.

<<Bus cycle>>

Figure 18:
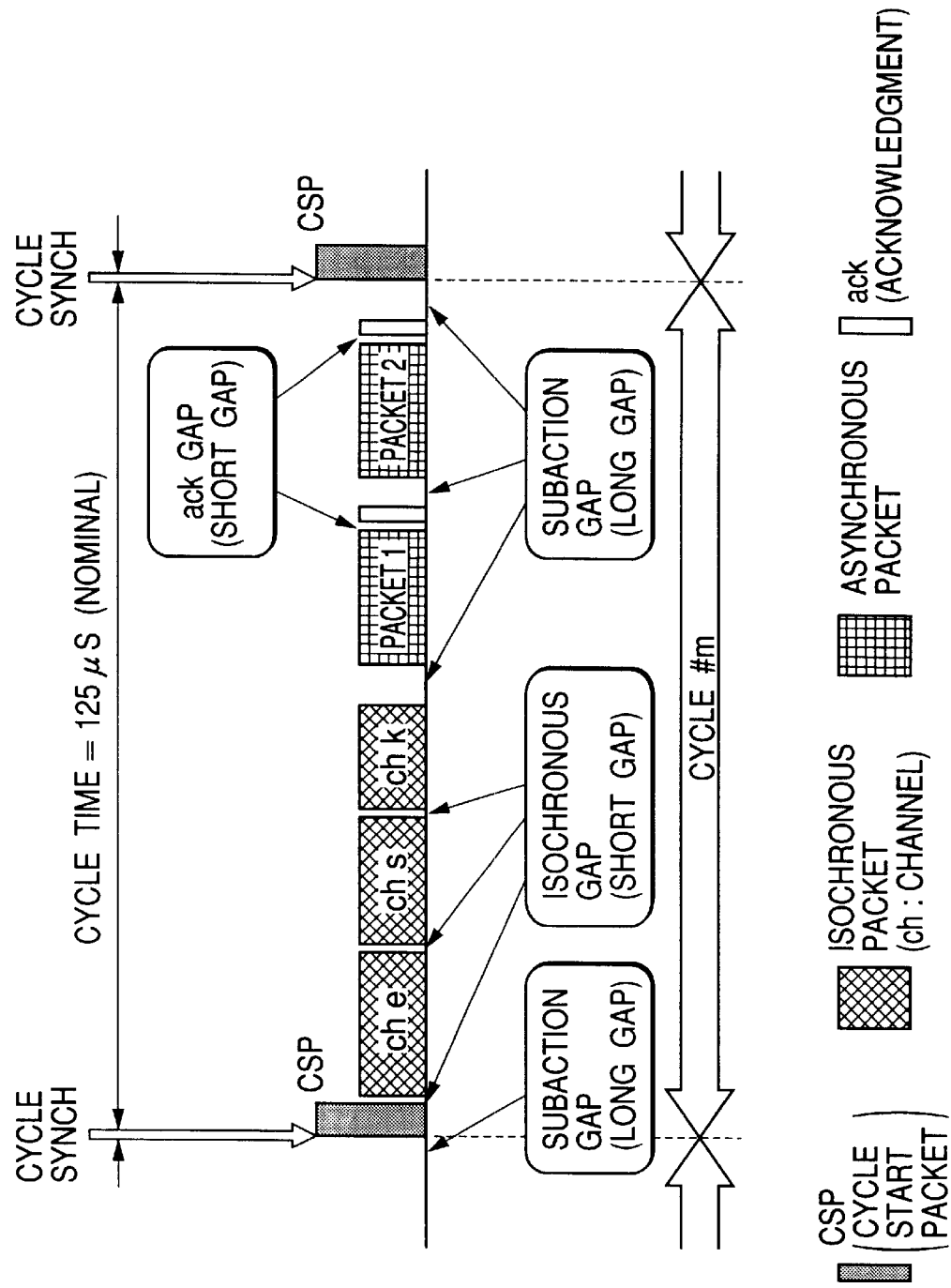
FIG. 18 is a diagram showing an example bus cycle during which a packet is transmitted along a 1394 serial bus.

For actual data transmission along the 1394 serial bus, isochronous transfers and asynchronous transfers can coexist. In FIG. 18 is shown the time-shift state on a bus where both an isochronous transfer and an asynchronous transfer are performed.

An isochronous transfer is performed before an asynchronous transfer because after the transmission of a cycle start packet, an isochronous transfer can be initiated that has a gap interval (isochronous gap) shorter than the gap interval (sub-action gap) for the idle time that is required for the performance of an asynchronous transfer. For this reason, an isochronous transfer is performed before an asynchronous transfer.

In FIG. 18, at the start of an ordinary bus cycle #m, the cycle start packet is transmitted by the cycle master to the nodes. Then, the individual nodes adjust the time, and when a predetermined idle time (an isochronous gap) has elapsed, the node that is to perform the isochronous transfer performs arbitration and begins the packet transfer. In FIG. 18, the packets for channel e, channel s and channel k are isochronously transferred in the named order.

The processing from the performance of the arbitration to the packet transfer is repeated the number of times that corresponds to the channel count, until the isochronous transfer during the cycle #m is completed, and then the asynchronous transfer is begun.

When the idle time reaches the sub-action gap, after which the asynchronous transfer is possible, the node that is to perform the asynchronous transfer decides that it can perform the arbitration.

It should be noted that the performance of the asynchronous transfer can only be performed when a sub-action gap, for initiating the asynchronous transfer, is obtained within a period extending from the completion of the isochronous transfer to the transfer of the next cycle start packet (cycle synch).

In the cycle #m in FIG. 18, only the isochronous transfer of data for three channels and the asynchronous transfer (including the ack code) of two packets (packet 1 and packet 2) are performed. Since when the time following the transmission of asynchronous packet 2 reaches the start time (cycle synch) for cycle m+1, the transfer of data during cycle #m is terminated.

If the start time (cycle synch) for the transmission of the next cycle start packet is reached during the asynchronous or the isochronous transfer, the transfer is not forcibly halted, and the transmission of the cycle start packet for the next cycle is delayed until the idle period following the transfer has elapsed. That is, when one cycle exceeds 125 $\mu$S, or is longer, the 125 $\mu$S reference length of the next cycle is shortened a period of time equivalent to the excess time required for the preceding cycle. The isochronous cycle can be extended or reduced while using 125 $\mu$S as the reference time.

However, the isochronous transfer must be performed each cycle in order to provide the real time transfer of data, while the asynchronous transfer may be performed the next cycle when there is a reduction in the length of the cycle interval.

The cycle master manages such delay information as well as other information.

This completes the explanation of the IEEE 1394 serial bus.

An explanation will now be given for a network according to the first embodiment for which the individual apparatuses are connected by a 1394 serial bus cable, as is shown in FIG. 2. The network comprises: a printer 101, which serves as a direct printer or a network printer; a VTR (camera-incorporated digital video) 102, which is connected to the printer 101 by the 1394 serial bus and which permits the printer 101 to print video data directly and also can transmit such video data to another connected apparatus via the printer 101; a personal computer (hereinafter referred to as a PC) 103, which is connected to the printer 101 by the 1394 serial bus; and a scanner 104, which is connected to the PC 103 by the 1394 serial bus. The apparatuses in the network in FIG. 2 are merely examples; other apparatuses may be connected to the PC 103 and the scanner 104. In addition, an external storage device, such as a hard disk, or a CD or a DVD, may be connected so long as they construct a network using a 1394 serial bus.

With the network configuration in FIG. 2, the processing according to this embodiment will now be described while referring to FIG. 1.

Figure 1:
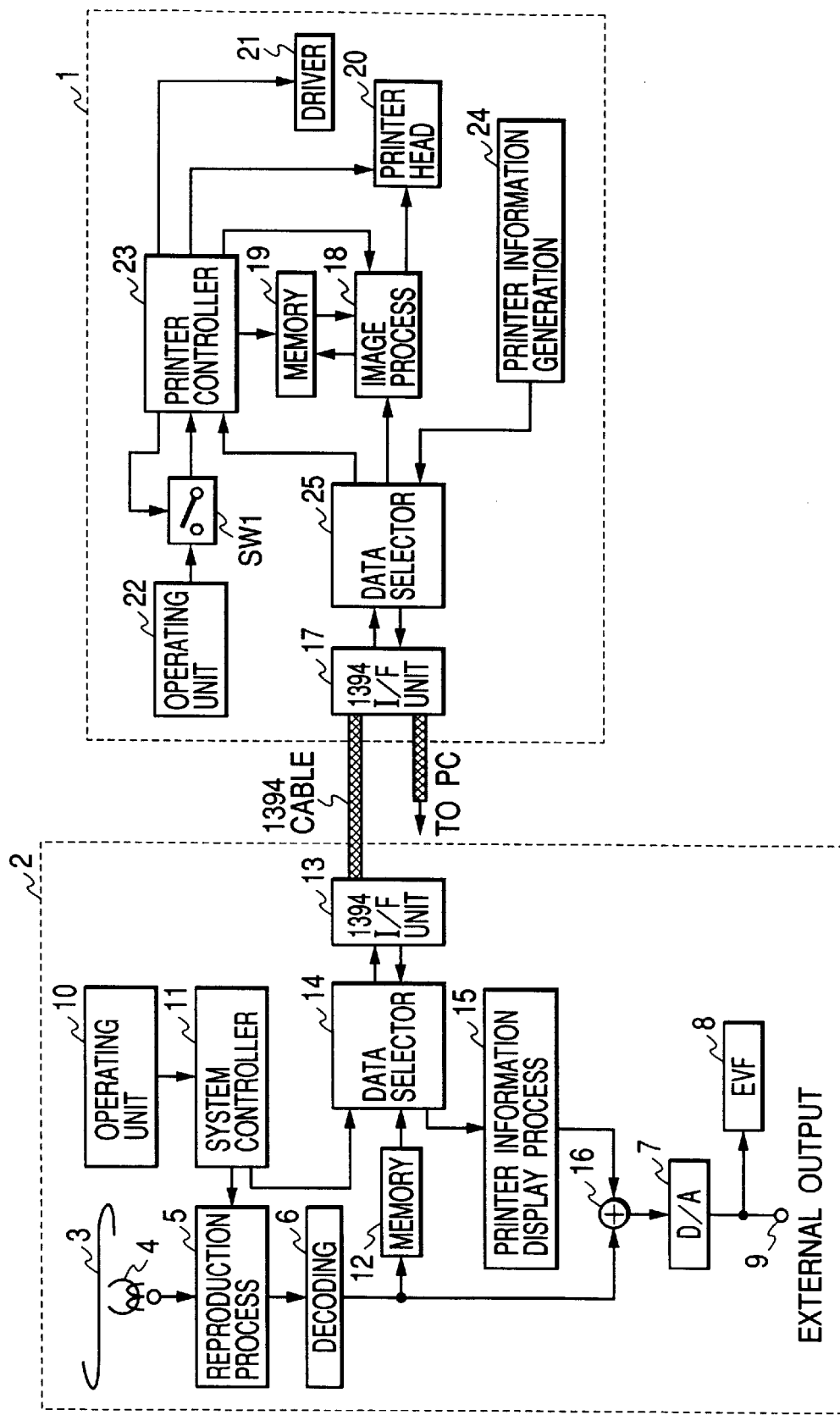
FIG. 1 is a block diagram illustrating a printer and a VTR according to a first embodiment of the present invention.

FIG. 1 is a block diagram illustrating the network.

In FIG. 1, a VTR 2 comprises: a magnetic tape 3 as a recording medium, which may be replaced by another recording medium, for example, an optical disk semiconductor memory; a recording/reproduction head 4; a reproduction processor 5; a video decoder 6; a D/A converter 7; an EVF 8 for confirming a reproduced image or an image to be printed by the printer 1; an external output terminal 9; an operating unit 10 for entering an instructions; a system controller 11 for a VTR; a frame memory 12; a VTR 1394 interface (I/F) 13; a selector 14 for a plurality of data types; a display processor 15 for displaying printer information on the EVF 8; and a video synthesizer 16. A printer 1 comprises: a printer 1394 interface (I/F) 17; an image processor 18, which forms an image to be printed by the printer 1 and which performs binary processing, color correction, etc.; a memory 19 used to assemble image data to obtain a printed image; a printer head 20; a driver 21 for driving the printer head 20 and for feeding paper; an operating unit 22 for controlling the operation of the printer 1; a printer controller 23; a printer information generator 24 for producing the operating state of the printer 1 as printer information during the direct printing process; a data selector 25; and a switch SW1, which is opened and closed by the printer controller 23.

Only the reproduction system of the VTR 2 is shown in FIG. 1. To simplify the explanation, the PC 103 and the scanner 104 in FIG. 2 are not shown.

The processing performed by the network in FIG. 1 will now be described.

First, video data recorded on the magnetic tape 3 are read by the recording/reproduction head 4, and are processed by the reproduction processor 5 in accordance with a reproduction form. Since the video data have been coded using a predetermined compression method based on a DCT (discrete cosine transformation) and VLC (variable length coding), which are home digital video band compression methods, a predetermined decoding process is performed for the video data by the decoder 6. The decoded data are converted into an analog video signal by the D/A converter 7, and the video signal is displayed on the EVF 8, or is output to an output device via the external output terminal 9.

To transfer desired video data to anther node using the 1394 serial bus, the video data decoded by the decoder 6 are temporarily held in the frame memory 12, and are then transmitted via the data selector 14 to the 1394 I/F 13, which in turn transfers the data to the printer 1. When the received video data are for direct printing, they are fetched to the inside of the printer 1, and when the video data are those to be transferred to another node, they are passed through the 1394 I/F 17 to the objective node.

An instruction to the VTR 2, for example, for the reproduction of data can be entered by using the operating unit 10. Further, a direct printing instruction to the printer 2 can also be entered by using the operating unit 10. Upon receipt of an instruction from the operating unit 10, the system controller 11 initiates control procedures for the individual sections, including the VTR reproduction processor 5, and, upon receipt of a specific instruction, generates a control command for the printer 1, and as command data, transmits it to the printer 1 via the data selector 14 and the 1394 I/F 13.

The operating state of the printer 1 and printer information, such as an alarm message and printed image data, which are received from the printer 1 via the 1394 serial bus, are transmitted through the 1394 I/F 13 and the data selector 14 to the printer information display processor 15, which changes the data into a form that can be used for a display. The resultant data are synthesized with a currently displayed video image by the video synthesizer 16, and the synthesized image is then displayed on the EVF 8.

A switching circuit may be provided instead of the video synthesizer 16, so that the two display data types may be selectively displayed.

The data selector 14 and the data selector 25 of the printer 1 select data to be input or output, and individual data, which are identified according to their data type, are input to or output from a predetermined block.

The operation performed by the printer 1 will now be explained. The data input to the 1394 I/F 17 are sorted according to their data types by the data selector 25. Then, data that are to be printed are sent to the image processor 18, whereat for printing, adequate image processing of the data performed. The resultant data are stored as print image data in the memory 19, which is controlled by the printer controller 23, and are then transmitted to the printer head 20 and are printed. The driver 21 drives the printer head 20 and feeds the paper, both the driver 21 and the printer head 20 being controlled by the printer controller 23.

The printer operating unit 22 is used to enter instructions for paper feeding, resetting, checking of ink, the preparation/ halting of printing, etc., and in accordance with instructions that are received, the printer controller 23 controls the individual sections. When the switch SW1, which is normally closed, receives a specific command from the printer controller 23, it releases the connection to all key entries or to a part of the key entries of the operating unit 22 during a specific period of time or under a specific environment, and inhibits the entry of all commands or of a specific command. Instead of employing the switch SW1, the printer controller 23 may itself inhibit the entry of a specific command.

When the data received by the 1394 I/F 17 constitute a command that is generated by the VTR 2 for the printer 1, the data are transmitted as a control command from the data selector 25 to the printer controller 23, which in turn controls the individual sections of the printer 1.

The operating state of the printer 1, a message indicating that the printing has been completed or that printing is ready, an alarm message for paper jamming, an operational failure or a lack of ink, and printed image information are transmitted as printer information by the printer information generator 24 to the data selector 25, and are output externally at the 1394 I/F 17. The printer information is processed by the printer information display processor 15 in the VTR 2 to obtain information to be displayed on the EVF 8, as previously described.

Since a user can view on the EVF 8 a message or a printed image display based on the printer information, and can use the operating unit 10 to enter a command for the printer 1 that appropriately copes with a condition described in the message, control command data are transmitted along the 1394 serial bus that enable the printer controller 23 to control the individual sections of the printer 1 and the image processor 18 to control the images to be printed.

As is described above, video data and command data are transmitted as needed along the 1394 serial bus that connects the VTR 2 to the printer 1.

In accordance with the previously described specifications for the 1394 serial bus, video data (and audio data) from the VTR 2 are to be transmitted mainly as iso data across the 1394 serial bus by the isochronous transfer method, and command data are to be transmitted as async data by the asynchronous transfer method. However, since an asynchronous transfer is better than an isochronous transfer for a specific data type, such data are transmitted using the asynchronous transfer method.

The printer information issued by the printer 1 is transmitted as async data using the asynchronous transfer method. However, a large quantity of print image data, for example, may be transmitted as iso data using the isochronous transfer method.

This completes the explanation for the arrangement shown in FIG. 1. When the network shown in FIG. 2 is formed by using the 1394 serial bus, in accordance with the specifications for the 1394 serial bus the VTR 2 and the printer 1 can exchange data bidirectionally with the PC 103 and the scanner 104.

It is ordinarily preferred, for the direct printing of video data transferred from the VTR 2 to the printer 1, that control of the printer 1 be effected by operating only the VTR 2, and this procedure is implemented by the arrangement in FIG. 1. Therefore, during direct printing, only the VTR 2 need be operated to control the individual sections of the printer 1. In this embodiment, the entry at the operating unit 10 of all instructions or of a specific command to the printer 1 is inhibited (is not accepted) in order to prevent the performance of various erroneous operations during direct printing. To implement this, before video data for direct printing are received, the printer 1 receives the async data, which designates the start of direct printing, from the VTR 2 across the 1394 bus, and the printer controller 23 opens the switch SW1.

The mutual identification effected between the VTR 2 and the printer 1 for the start of a direct printing operation (mode) is initiated at the time the direct print start data are exchanged. The direct printing mode is terminated when direct printing end data are asynchronously transferred from the VTR 2 across the 1394 bus to the printer 1, or when the 1394 serial bus is disconnected from the VTR 2 and the printer 1. When the printer controller 23 detects the end of the direct print mode, it again closes the switch SW1. When the resetting of the 1394 serial bus occurs or when a network having a new configuration is formed, the printer 1 can automatically identify whether or not the 1394 serial bus has been disconnected.

Figure 5:
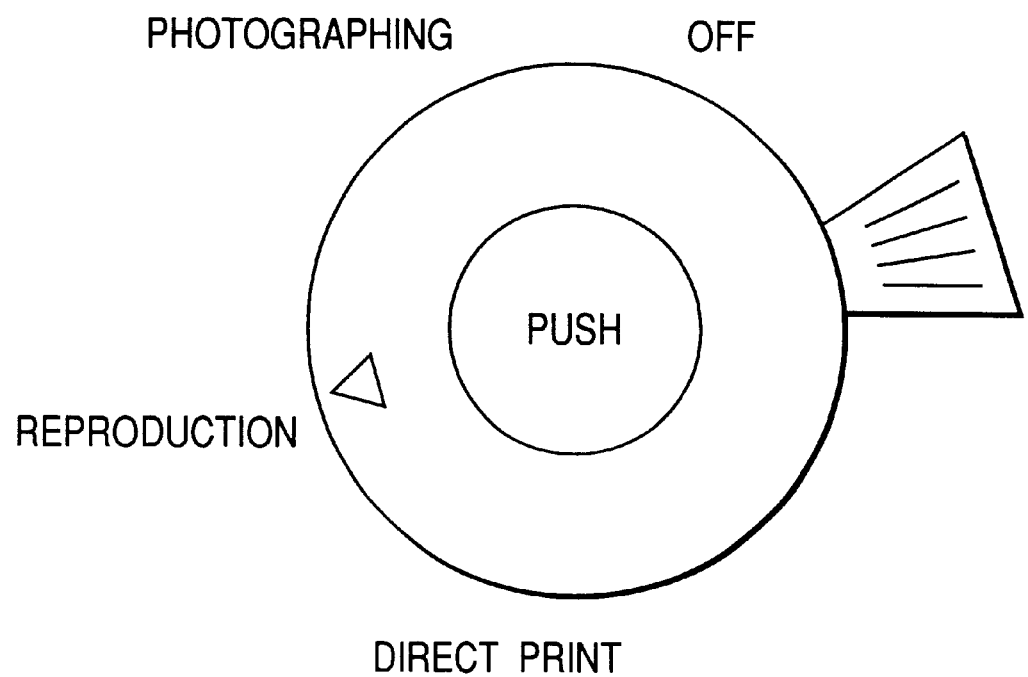
FIG. 5 is a diagram showing an example switch used for the present invention.

A switch shown in FIG. 5, for example, is provided as one of the switches for the operating unit 10 of the VTR 2 in order to enter a start/end command for direct printing. In FIG. 5, "OFF" represents the power-OFF state, "Photographing" represents a position for recording pictures and sounds, and "Reproduction" represents a position for normal reproduction, while "Direct Print" represents the position for the direct print mode. When the switch is set to this position, the VTR 2 transmits a direct print start command to the printer 1, and when the switch is turned to another position, the VTR 2 transmits a direct printing end command. A "Push" key in the center may serve as a trigger for a photographing process, a command input switch for making a selection, and a video data transmission start switch included for direct printing.

Instead of employing the switch in FIG. 5 for the transmission of a direct print start/end command separately from video data, when the video data are transmitted from the VTR 2 to the printer 1 using the previously described 1394 serial bus transfer method, whether or not direct printing is to be performed may be determined by examining the header information of a packet that includes the video data.

The sequence by which the entry of an instruction at the operating unit 22 of the printer 1 is inhibited in the direct printing mode, to include the processing performed by the VTR 2 and the printer 1 during direct printing, will now be explained while referring to the flowchart in FIG. 6.

First, at step S1 in the normal mode, the printer operating unit 22 is set to the instruction entry enabled state, and the switch SW1 in FIG. 1 is closed (ON). At step S2, before a user shifts the mode to the direct print mode, a direct print start command is transmitted from the VTR 2 by the above described method. The start command is transferred across the 1394 serial bus as an asynchronous packet. At step S3 the printer 1 receives the command, and at step S4 the printer controller 23 opens the switch SW1 (OFF) as part of the direct print mode start. As a result, in the direct print mode, the switch SW1 and the operating unit 22, or the printer controller 23, function so as to halt, invalidate or ignore all instructions, or a specific instruction, entered at the printer operating unit 22. That is, a specific instruction can not be accepted, or can be invalidated or ignored.

When at step S3 a start command has not been received, the closed switch SW1 is maintained in the normal mode until it is received.

In parallel to the process for shifting the printer 1 to the direct print mode, using the VTR 2 a user selects pictures to be printed. If, at step S5, an arbitrary picture is designated for transfer, at step S6 the designated video data are transferred as an asynchronous packet across the 1394 serial bus. Program control thereafter moves to step S9. If, at step S5, no picture is designated, the transfer of video data is not performed, and program control moves to step S9.

At step S7, the printer 1 receives the packet of video data across the 1394 serial bus, and at step S8 the received video data are printed following a predetermined sequential arrangement. After the printing process has been completed, program control returns to step S7 and the next set of video data are received.

At step S9, the user makes a selection as to whether the direct print mode for VTR 2 will or will not be terminated and whether the next set of video data are to be designated and transferred. If, at step S9, the user desires not to terminate the direct print mode but to designate another picture, program control returns to step S5, whereat an arbitrary picture can be designated. The designation of pictures at step S5 and the transfer of the designated video data are repeated at step S9. In particular, for the printing of a plurality of sheets, the transfer of data is controlled while coordinating it with the operation of the printer 1.

When, at step S9, the user elects to end the direct print mode, at step S10 a direct print end command is transmitted and the end command data is transferred as an asynchronous packet across the 1394 serial bus. The direct print mode of the VTR 2 is thereafter terminated.

When the printer 1 does not receive from the VTR 2 video data to be printed, program control moves to step S11 to accept the direct print end command. If, at step S11, no direct print end command is transmitted by the VTR 2, program control returns to step S7, whereat the direct print mode is maintained and video data from the VTR 2 are accepted.

If, at step S10, the direct print end command data packet is received from the VTR 2, at step S11 the direct print mode of the printer 1 is terminated. At step S12, the printer controller 23 closes the switch SW1 in order to return to the normal operation mode. Thereafter, the direct print modes for the VTR 2 and the printer 1 are terminated.

Figure 6:
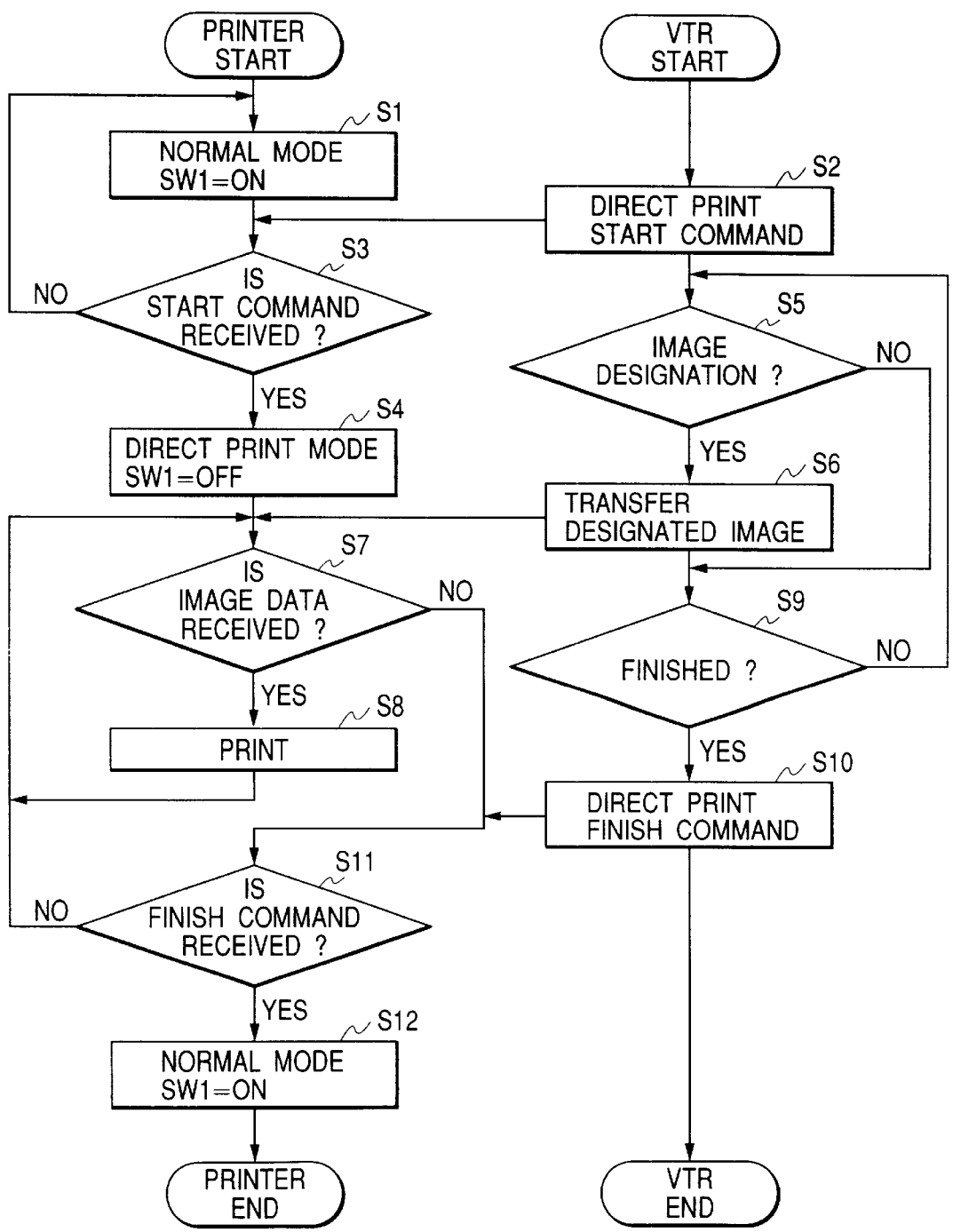
FIG. 6 is a flowchart showing the operations performed by the VTR and the printer according to the embodiment of the present invention.

This completes the explanation of the processing in the flowchart in FIG. 6.

When during the direct print mode the 1394 serial bus cable is disconnected from the VTR 2 and the printer 1 for a specific reason, as previously described the printer 1 can automatically determine that the VTR 2 is not connected by detecting the bus resetting and the formation of a new network configuration. As a result, the printer 1 assumes that a direct print mode end command has been issued and turns on the switch SW1 to return to the normal operation mode. As a result, the printer 1 can resume its operation as a network printer.

This completes the description for the first embodiment.

<Modification>

An explanation will be given for one modification of the present invention where the VTR 102 in FIG. 2 is replaced by a digital camera.

Figure 4:
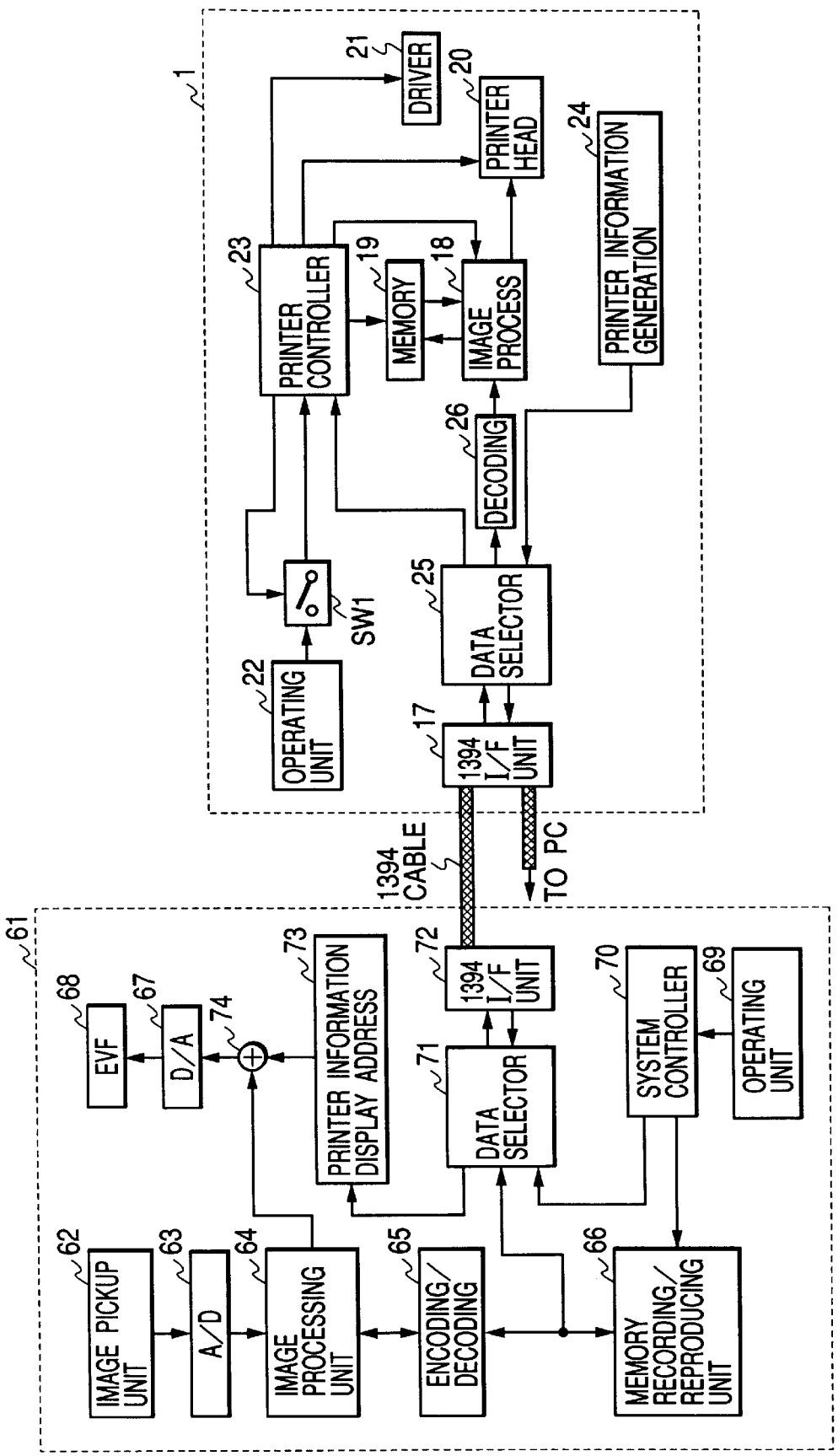
FIG. 4 is a block diagram illustrating a printer and a digital camera according to the present invention.

FIG. 4 is a block diagram showing an arrangement according to the present invention wherein a digital camera and a printer are connected by a 1394 serial bus cable.

In FIG. 4, a digital camera 61 comprises: an image pickup unit 62; an A/D converter 63; an image processor 64; an image encoding/decoding unit 65; a memory recording/reproduction unit 66 for recording and reproducing an image; a D/A converter 67; an EVF 68 as a display unit; an operating unit 69; a system controller 70; a data selector 71; a digital camera 1394 interface (I/F) 72; a printer information processor 73 for displaying printer information; and a video synthesizer 74.

A printer 1 is substantially the same as that explained in the first embodiment, except that a decoding circuit 26 is provided between a data selector 25 and an image processor 18 in the printer 1.

The image encoding/decoding unit 65 of the digital camera 61 employs the JPEG method, a well known technique for encoding static images.

The processing in FIG. 4 will now be explained.

Image data obtained by the image pickup unit 62 of the digital camera 61 are digitized by the A/D converter 63, and the digital data are processed by the image processor 64 into images appropriate for a display. The output signal of the image processor 54 is converted into an analog signal by the D/A converter 67 as a picture that is being picked up, which is in turn displayed on the EVF 68. The other output signal is encoded by the encoding/decoding unit 65 using the JPEG method, and the coded data are stored in the memory by the memory recording/reproducing unit 66.

For the reproduction of data, data for a desired image are read from the memory by the memory recording/reproducing unit 66. Information entered by the operating unit 69 is employed in selecting the desired image, which is read under the control of the system controller 70. The image data read from the memory are decoded by the encoding/decoding unit 65 using the JPEG method, and the decoded image data are processed by the image processor 64 and the D/A converter 67. The resultant data are then displayed on the EVF 68.

When desired image data are read from the memory and are to be directly printed or to be transferred to another PC connected by the 1394 serial bus, the 1394 serial bus is employed to transmit the image data via the data selector 71 and the 1394 I/F 72. At this time, the image data, which are still coded using the JPEG method, are reproduced by the memory recording/reproducing unit 66 and are output, so that for direct printing the printer 1 must decode the image data.

The processing performed by the printer 1 is the same as that for the first embodiment, and only the processing performed by the encoding/decoding circuit 26 will now be described. The JPEG compressed image data transmitted by the digital camera 61 are decoded by the decoding circuit 26. The decoding circuit 26 employs a JPEG decoding program file stored in an internally provided ROM, or data for decoding that are transmitted with compressed image data by the digital camera 61, so that data decoding is performed at the printer or at the CPU based on software.

Since the JPEG compressed image data are transferred from the digital camera 61 to the printer 1, which in turn decodes the image data, the transfer efficiency is higher than it is when image data are decompressed and the resultant data are transferred. In addition, since JPEG decoding based on software can be performed, manufacturing costs will not be increased even when a decoder is provided for the printer. A JPEG decoder (a board) for hardware decoding may be provided as the decoding circuit 26.

The operating unit 69 can be used to enter instructions for the individual sections of the digital camera 61, and can also be used to enter instructions for the printer 1. In accordance with the instructions entered at the operating unit 69, the system controller 70 controls the individual sections including the recording/reproducing unit 66 of the digital camera 61. A control command to the printer 1 is produced upon the receipt of a specific instruction, and the command data are transferred to the data selector 71 and the 1394 I/F 72 and to the printer 1.

The operating state of the printer 1 and printer information, such as alarm messages and printed image data, which are received from the printer 1 across the 1394 serial bus, are transmitted via the 1394 I/F 72 and the data selector 71 to the printer information display processor 73, which changes the data into a display form. The resultant data are synthesized with a currently displayed video image by the video synthesizer 74, and the synthesized image is then displayed on the EVF 68. A switching circuit may be provided instead of the video synthesizer 74, so that the two display data types may be selectively displayed.

The data selector 71 selects data so that individual data are identified according to the data type and are input to or output from a predetermined block.

In accordance with the previously described specification of the 1394 serial bus, video data are mainly to be transmitted as iso data across the 1394 serial bus using the isochronous transfer method, and command data are to be transmitted as async data using the asynchronous transfer method. However, since an asynchronous transfer is better than an isochronous transfer for specific types of data, such data are transmitted using the asynchronous transfer method.

This completes the explanation of the arrangement in FIG. 4. When a network is formed with the 1394 serial bus to which is added another apparatus to the printer 1, in accordance with the specifications for the 1394 serial bus the digital camera 61 and the printer 1 can exchange data bidirectionally with a PC 103 and a scanner 104.

When the direct printing of image data transferred from the digital camera 61 to the printer 1 is to be performed using the arrangement in FIG. 4, generally, the individual sections of the printer 1 can be controlled by operating only the digital camera 61. In this embodiment, the entry of all instructions or of a specific command to the printer 1 at the operating unit 10 is inhibited (is not accepted) in order to prevent a variety of erroneous operations during direct printing. To implement this operation, before video data for direct printing are received, the printer 1 receives async data, which designate the start of direct printing, from the digital camera 61 across the 1394 bus, and the printer controller 23 opens the switch SW1.

As in the first embodiment, control of the operating unit 22 and the printer controller 23 to invalidate part of the operating information can be based on software.

The mutual identification process performed between the digital camera 61 and the printer 1 at the start of the direct printing operation (mode) is initiated at the time direct print start data are exchanged. The direct printing mode is terminated when direct printing end data is asynchronously transferred from the digital camera 61 across the 1394 bus to the printer 1, or when the 1394 serial bus is disconnected from the digital camera 61 and the printer 1. When the printer controller 23 detects the direct print mode end, it closes the switch SW1. When the bus resetting of the 1394 serial bus occurs or when a configuration of a new network is formed, the printer 1 can automatically determine whether or not the 1394 serial bus has been disconnected.

Since the system operation of the printer 1, and the processing performed by the digital camera 61 and the printer 1 during direct printing are the same as those explained in the first embodiment and correspond to the flowchart in FIG. 6, no explanation for them will be given.

This completes the description of the modification of the invention.

<Other Modification>

A printer is controlled by a visual interface (a so-called GUI) using the monitor of a common PC. However, since during direct printing all the functions are not monitored as they are when using a GUI, the printer may be so set that only functions supported by the camera are enabled and functions that can not be monitored are invalidated.

As is described above, according to this modification, a printing process that a user desires to execute first can be rapidly performed by employing direct printing.

When, during the printing process, a printing command is accepted from a camera or a VTR, the entry of commands at the operating unit of the printer is inhibited, so that the performance of erroneous operations during direct printing can be prevented, or so that the occurrence of erroneous operations can be reduced.

For the direct printing performed using the 1394 serial bus, data for printing images can be transmitted without passing through the PC. As a result, the process can be performed rapidly without being affected by the operating state of the PC, and any load imposed on the PC by the printing of data can be eliminated.

Since only functions the operating state of which can not be confirmed are invalidated, the erroneous printer operations can be reduced, and a preferable user interface can also be provided for direct printing.

In this embodiment, the interface that conforms to the 1394 standards has been explained, but the present invention is not thereby limited; another interface, such as an infrared ray interface or a wireless interface, may be employed.

In addition, an ink-jet printer or an electrophotographic printer may be employed.

According to the embodiment, the operations of two nodes can be arbitrated without each node being instructed.

Also, according to the embodiment, since during direct printing commands from a camera or a VTR are accepted and the entry of commands at the operating unit of the printer is inhibited, the performance of erroneous operations is prevented and usability is enhanced.

<Second Embodiment>

Figure 23:
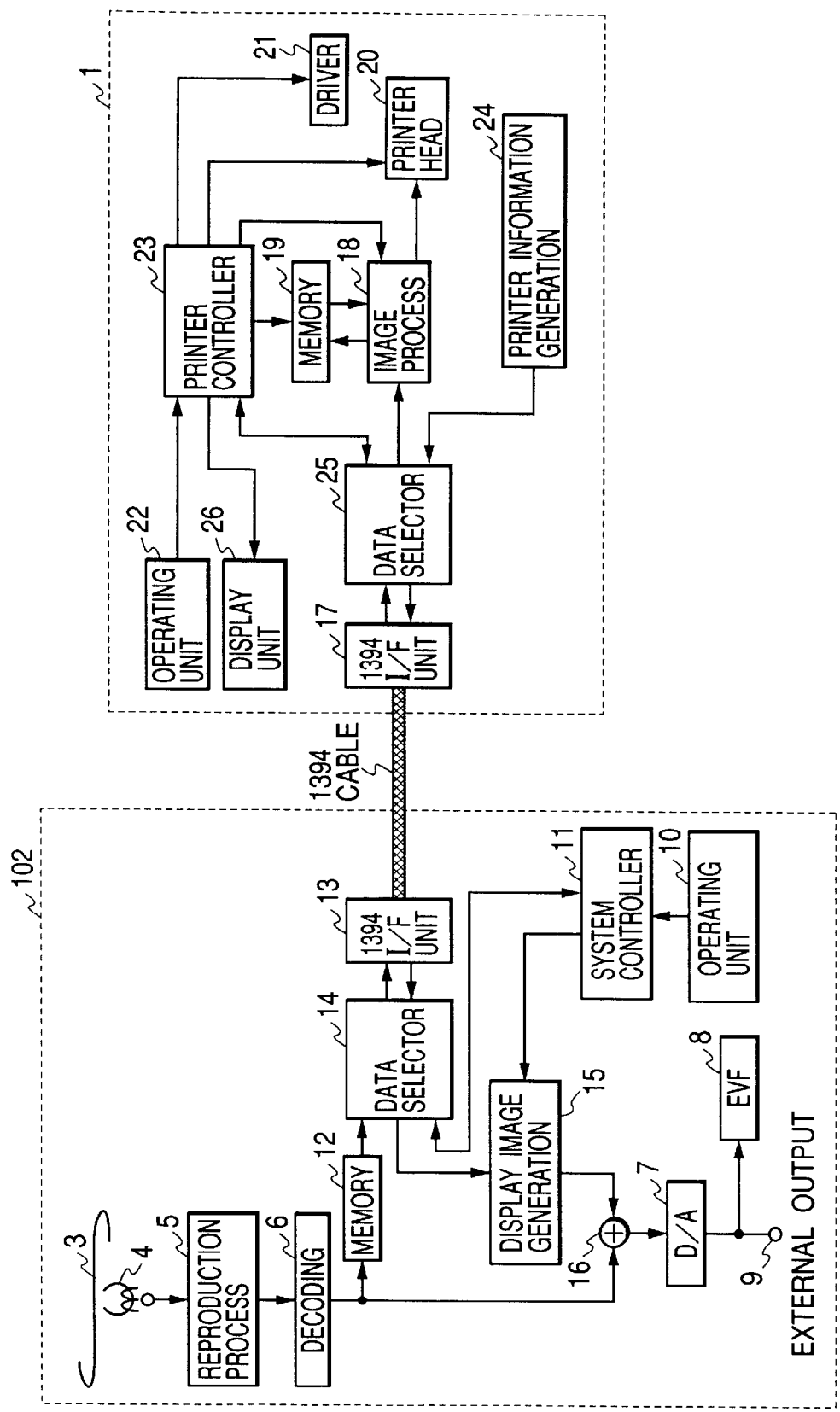
FIG. 23 is a block diagram illustrating a printer and a VTR according to a second embodiment of the present invention.

A second embodiment of the present invention will now be described while referring to FIG. 23. In FIG. 23, as the same reference numerals as are used in FIG. 1 are used to denote components having the same functions as those in FIG. 1, no further explanation will be given.

In FIG. 23, a difference from the first embodiment is that, in addition to an operating unit 22, a display device (a liquid crystal indicator) 23 provided for a printer, and a system controller 11 is connected directly to a display image generator 15.

The operation performed with the above described arrangement will now be explained.

In the second embodiment, as well as the previous embodiment, an operating unit 10 is employed for the entry of instructions for various operations, such as reproduction. Upon the receipt of an instruction from the operating unit 10, the system controller 11 controls the individual sections. When a specific instruction is entered, the system controller 11 outputs a specific alarm message to the display image generator 15, or generates sub-data for image data or command data for direct printing and transmits them as control data to a printer 101 via a data selector 14 and a 1349 I/F 13.

A display unit 26 in the printer 101, controlled by a printer controller 23, displays the operating state of the printer 101 or the operating state including that of a VTR 102 during direct printing, and together with an operating unit 22 in the printer 101 can implement a user interface.

Figure 24A:
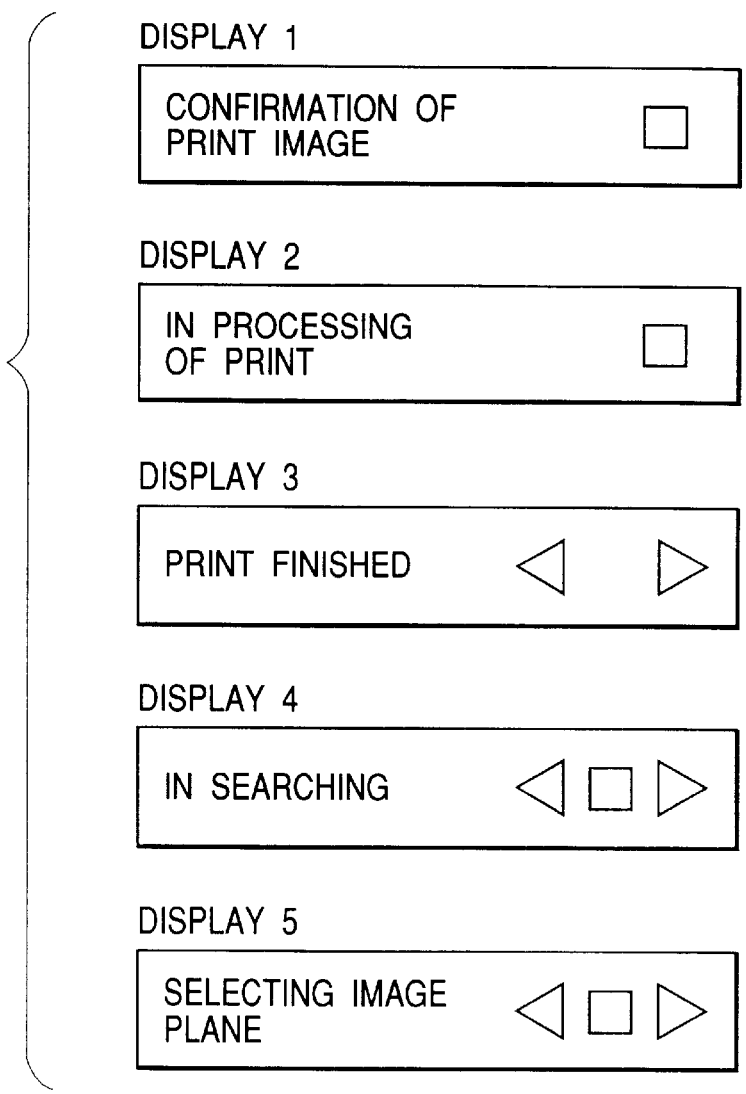
FIGS. 24A and 24B are diagrams showing example displays according to the second embodiment of the present invention.

FIG. 24A is a diagram showing an example message presented on the display unit 26 of the printer 101, primarily during direct printing. There are five patterns shown: "Confirmation of print image", "In processing of print", "Print finished", "In (VTR) searching" or "Image searching", and "Selecting image plane". Another message may be presented on the display unit 26. These messages represent the operating state of the printer 101, and the processing conditions and information to be confirmed for the printer 101 and the VTR 102 during the direct printing. When a user employs both messages displayed on the display unit 26 and the operating unit 22 of the printer 101, he or she can smoothly enter at the operating unit 22 an instruction to the printer 101, and instructions of various operations for the VTR 2 during the direct printing.

Figure 24B:
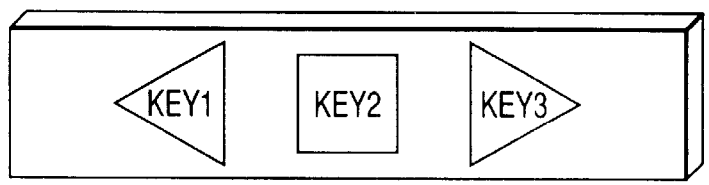

An example key arrangement for the operating unit 22 of the printer 101 is shown in FIG. 24B.

Entry of an instruction is easier by displaying keys of the operating unit 22 to be used by the user relative to the displayed message. The operating unit 22 and the display unit 26 may be combined; the display unit 26 may be formed as a so-called touch panel to enter an instruction.

As is described above, the operating unit 22 and the display unit 26 are provided for the printer 101, with which an instruction for the VTR 102 can be entered. As a result, during the direct printing, the printer 101 can transmit, to the VTR 102, sub-data for image data, an instruction for searching for a specific picture by using sub-code recorded on the magnetic tape 3 or ITI track information, a tape forwarding (searching) instruction, an instruction for selection of a picture to be printed, and an instruction for data transfer. As a result, the operation of the VTR 102 can be controlled by entering control and operation instructions at the printer 101. Even for a VTR 102 that does not include a liquid crystal display, the printing process can be smoothly performed under the control of the printer 101 having the display unit 26.

As was previously described, during direct printing, image data and a variety of command data are transmitted as needed across the 1394 serial bus that connects the VTR 102 and the printer 101.

Transfer of data from the VTR 102 across the 1394 serial bus is performed based on the specifications for the 1394 serial bus. That is, assuming that image data (audio data) are transmitted as iso data across the 1394 serial bus using the isochronous transfer method, and that other command data are transmitted as async data using the asynchronous transfer method, since the asynchronous transfer method is much preferable to the isochronous method for specific data, the asynchronous transfer method is employed in such a case.

The print information output by the printer 101 and the control command data forwarded to the VTR 102 are transferred primarily as async data using the asynchronous transfer method.

With the previously described arrangement for this embodiment in FIG. 23, when direct printing is performed of image data transmitted from the VTR 102 to the printer 101, the entry of predetermined instructions at the operating unit 10 of the VTR 102 for interrupting the direct printing operation is inhibited based on software, or such instructions are invalidated or ignored, so that the number of the variety of erroneous operations that occur during direct printing can be reduced. An instruction that is entered at the operating unit 10 of the VTR 102 for interrupting the direct printing is, for example, a command to rewrite image data in the output source memory 12 during data transmission, or a command to alter the direct printing mode.

In direct printing, if a buffer memory for storing print image data for one image or more is not provided for the printer 101, image data must be transmitted as needed, in consonance with the printing condition of the printer 101, from the frame memory 12 of the VTR 102 to the printer 101. Therefore, if during the printing operation the VTR 102 rewrites the data in the memory 12, the image data to be printed will not be correctly transmitted to the printer 101. Similarly, when, during the transmission of image data from the VTR 102 to the printer 101, the direct print mode is changed to another mode, e.g., the recording mode or a reproduction mode, or a mode for transmitting data to a node other than the printer 101, this precipitates the occurrence of an erroneous printing operation. In order to prevent erroneous operations, in the second embodiment instructions entered at the operating unit 22 of the VTR 102 are invalidated during direct printing.

Whether or not direct printing is being performed by the VTR 102 is determined by the system controller 11 while examining the image transfer condition from the memory 12, the operating state of the printer 101 which is indicated by the printer information transmitted from the printer 101 to the VTR 102, and control data transmitted from the printer controller 23. When it is ascertained that direct printing is being performed, a predetermined instruction, such as mode change instruction, entered at the operating unit 10 is invalidated or ignored, so that the entry at the operating unit 10 will not be accepted.

While the entry of an instruction at the operating unit 10 is inhibited, or when a user mistakenly enters an instruction at the operating unit 10 during a period in which the entry of instructions at the operating unit 10 is inhibited, the system controller 11 permits the display image generator 15 to output a predetermined alarm message.

The mutual identification process performed between the VTR 102 and the printer 101 at the start of direct printing is performed according to a data transfer (print) start instruction entered by a user, or by the transmission of control data in consonance with a print image select command. Direct printing may be started by using control data based on an instruction entered at the operating unit 10 of the VTR 102, or by the transmission of image data directly from the VTR 102 to the printer 101.

The direct print mode is initiated by exchanging command data for the operation start. When video data has been transmitted by the VTR 102 and one image has been printed or the image data transmission and printing processing has been completed and control data to that effect has been transmitted to the other apparatuses, when the 1394 serial bus is disconnected from the VTR 102 and the printer 101, or when a command for forcible halting is entered from one of the nodes, the system controller 11 of the VTR 102 and the printer controller 23 of the printer 101 terminate the direct print mode. The disconnection of the 1394 serial bus can be automatically determined by the printer 101 by detecting the resetting of the 1394 serial bus and the formation of a new network configuration.

A sequence for an operation in which, during direct printing, a predetermined instruction entered by the operating unit 10 of the VTR 102 is invalidated and a predetermined alarm message is displayed will now be described while referring to a flowchart in FIGS. 25A and 25B, including the processing performed by the VTR 102 and the printer 101 during direct printing.

Figures 25, 25A:
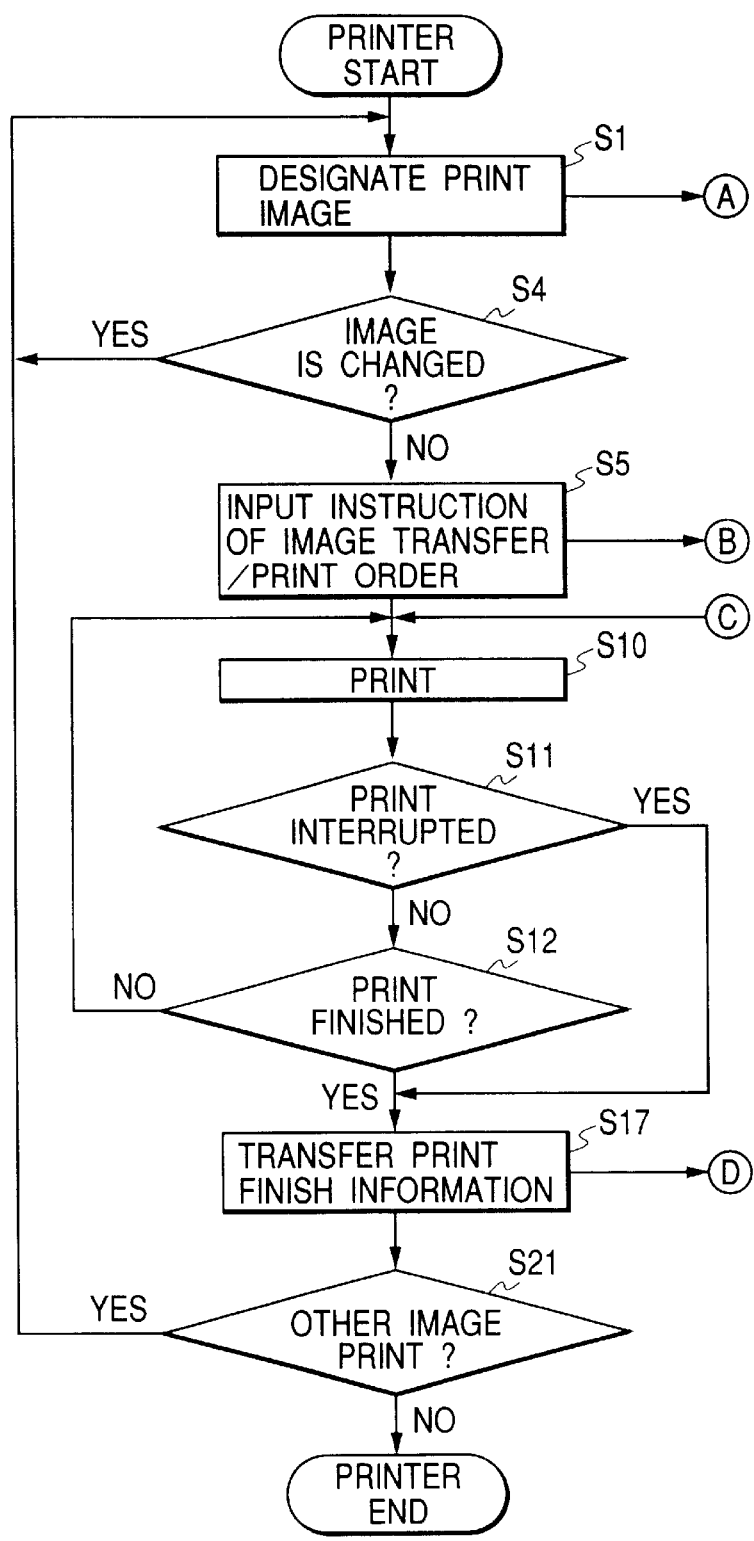
FIG. 25 which comprised of FIGS. 25A and 25B is a flowchart showing a direct printing process according to the second embodiment.
Figure 25B:
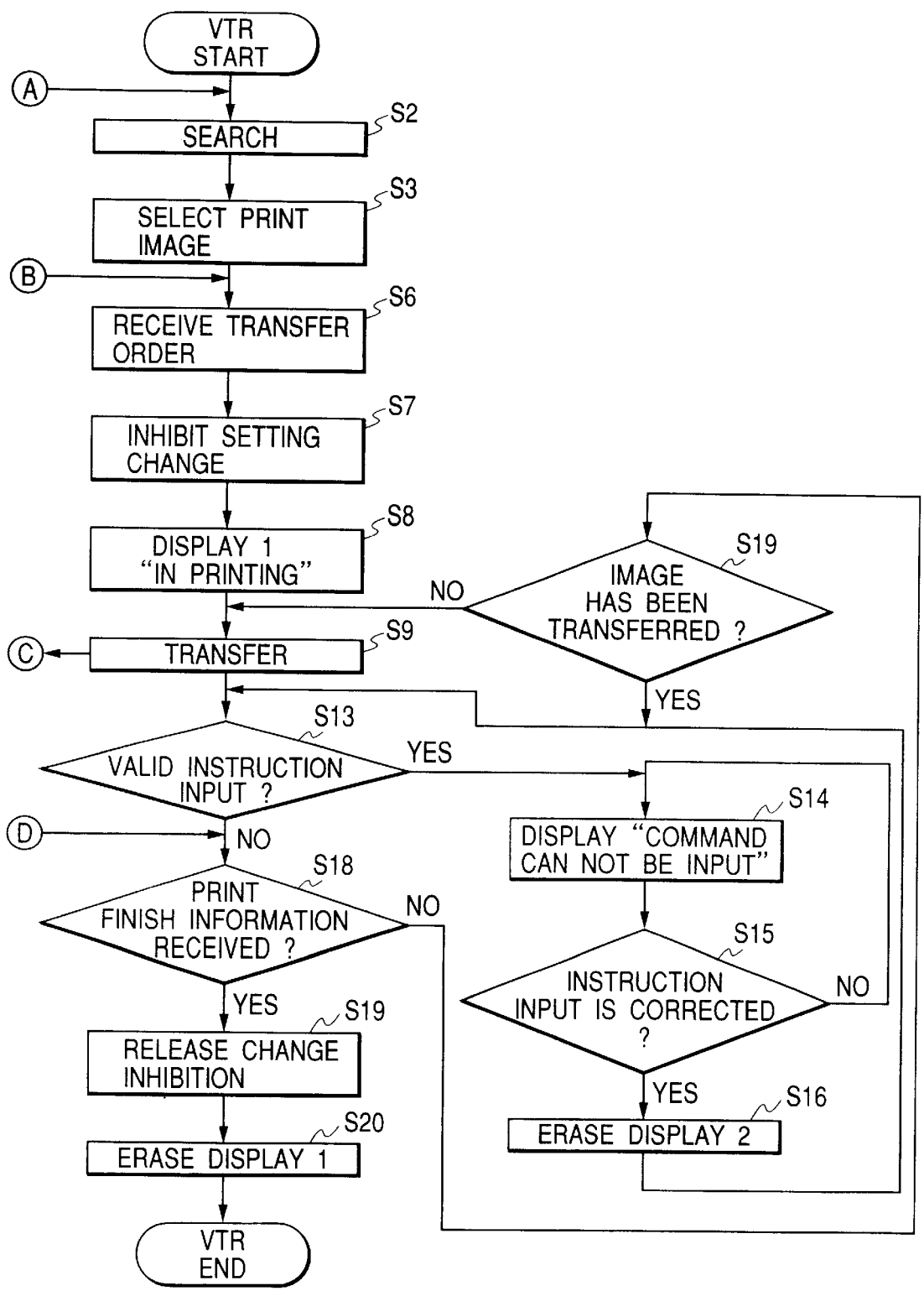

FIGS. 25A and 25B are flowcharts showing direct printing processing performed by the VTR 102 and the printer 101 in the second embodiment.

First, at step S1 a user designates a desired picture for the VTR 102 using the operating unit 22 of the printer 101, and instructs the VTR 102 to search for the video data. At step S2 the VTR 102 searches the video data recorded on the magnetic tape 3, and at step S3 selects data for the designated picture, reproduces the video signal from the magnetic tape 3, and stores it as image data in the frame memory 12. When the picture designated at step S1 is to be changed at the printer 101, at step S4 an instruction to the VTR 102 is entered to change the picture designated at step S1. Then, the picture to be printed can be altered.

After a desired picture is selected, program control moves to step S5, whereat it is confirmed in accordance with the message on the display unit 26 of the printer 101 that the preparation has been completed, and instructions for the VTR 102 to transmit the image data and for printing to be started are entered at the operating unit 22 of the VTR 102. In this manner, the direct printing start instruction is accepted.

When, at step S6, the VTR 102 receives the transmission/printing instruction, at step S7 it continually reads corresponding image data from the memory 12, and begins to either isochronously or asynchronously transmit packets via the 1394 serial bus to the printer 101. In addition, at step S7, at the same time as the transmission starts, setup change inhibition control based on software is initiated in order to inhibit or invalidate the entry of predetermined instructions, such as a direct print mode change instruction, that can interrupt the transmission of data. It should be noted that entry of a necessary command, such as the forcible halting of the direct printing processing, is enabled.

Following this, at step S8 a message (1) (e.g., "In processing of print"), which indicates the inhibition of the entry of an instruction at the operating unit 10 of the VTR 102, is displayed on the EVF 8 to draw the user's attention and to notify the user of the operating state. The inhibition of the setup change and the display of message (1) are continuously repeated until the operation series is terminated.

Then, at step S9 image data to be printed are read from the memory 12 of the VTR 102 a single time or repeatedly, and transmission of the data, as isochronous (or asynchronous) packets, is begun to the printer 101 via the 1394 serial bus.

When the printer 101 receives the image data packets across the 1394 serial bus, at step S10 the printing is begun according to predetermined procedures. When image data are continually transmitted, the printer 101 prints an image for each predetermined unit of image data. Transmission by the VTR 102 of image data and the printing at the printer 101 are repeated until at step S11 an instruction to halt the printing is entered, or until at step S12 the printing of an image is completed.

At step S13, the VTR 102 determines whether an instruction has been entered at the operating unit 10 in order to decide whether an invalid instruction or a mode change instruction has been entered during the direct printing, i.e., during a period from the start of the transfer of image data until the termination of the printing. When such an invalid instruction has been entered, at step S14 an alarm message (2) (e.g., "Command input disabled") is displayed on the EVF 8. This is an efficient way to notify a user of the current operating state, and to provide a display for preventing the performance of an erroneous operation by the user. At step S15, in accordance with the alarm message (2) displayed at step S14, the instruction that was input is corrected. When the corrected instruction is valid, program control advances to step S16 whereat the alarm message (2) is deleted.

The process at step S13 for detecting the entry of an invalid instruction at the operating unit 10 is repeated until the direct printing processing is terminated, i.e., until the print end notification is transmitted by the printer 101 to the VTR 102 at step S17 and is received at step S18. When, at step S18, the print end notification is not received from the printer 101, program control advances to step S19, whereat a check is performed to determine whether the image data have been transmitted. If the image data have not yet been transmitted, program control moves to step S9. If the image data have been transmitted, program control moves to step S13. As a result, the process is repeated in which an invalid instruction entered at the operating unit 10 of the VTR 102 is detected while image data are being transmitted from the printer 101 to the VTR 102, and in which when image data have been transmitted and are being printed by the printer 101, the entry of an invalid instruction is detected at step S13.

When the printer 101 ascertains at step S11 that halting of the printer is instructed, or at step S12 that image data from the VTR 102 have been received and data for one image has been printed, at step S17 the printer 101 transmits the print end notification to the VTR 102. Program control moves from step S18 to step S19, whereat the inhibition on the entry of a process altering instruction at the operating unit 10 is released. At step S20 the previously mentioned message (1) displayed on the EVF 8 is erased and the direct printing is thereafter terminated.

When, at step S17, the printer 101 has transmitted the print end notification, the printer 101 moves to step S21. When another picture is to be printed, program control returns to step S1, and the above described processing is repeated, beginning with the designation of a desired picture. This completes the explanation of the flowchart in FIGS. 25A and 25B.

When during the direct printing mode the 1394 serial bus connecting the VTR 102 and the printer 101 is disconnected for a specific reason, the printer 101 employs the occurrence of a bus reset and a new configuration of the network to automatically determine that the VTR 102 is not connected. In such a case, the printer 101 terminates the direct printing process after the current printing has been completed. When the 1394 serial bus is connected again immediately after the disconnection of the bus has been confirmed, the transfer of data may be resumed at a point where it was halted and the printing may be performed sequentially.

This embodiment can be implemented by using a digital camera instead of the VTR 102. An explanation will be given for the direct printing that is performed when a digital camera and a printer 101 are connected with a one-to-one correspondence by the 1394 serial bus.

Figure 26:
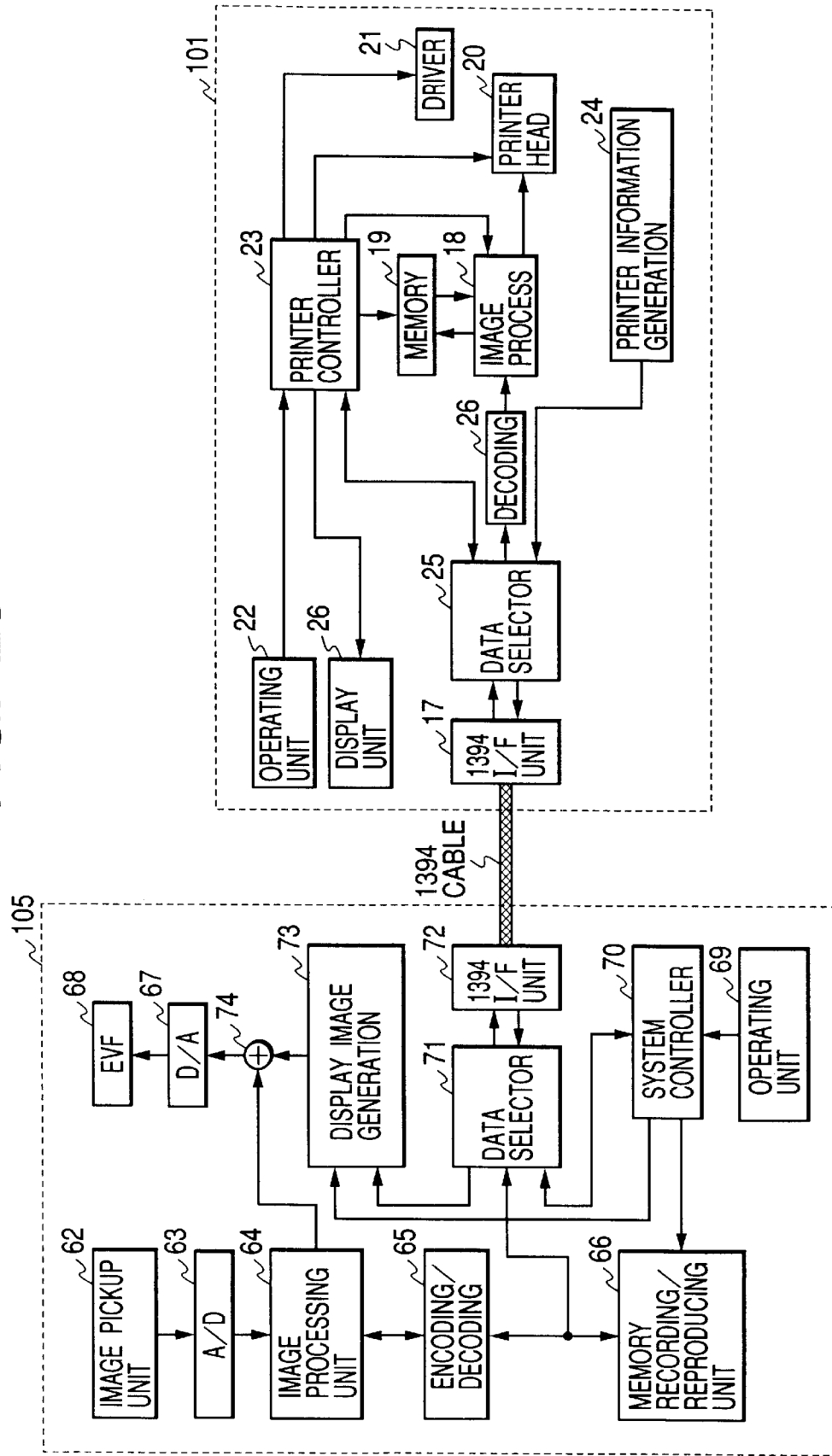
FIG. 26 is a block diagram illustrating a printer and a VTR according to a third embodiment of the present invention.

FIG. 26 is a block diagram illustrating an arrangement according to a modification of this embodiment, where a printer 101 and a digital camera 105 are connected together. The printer 101 is substantially the same as that in the second embodiment, except that a decoder 27 is provided between a data selector 25 and an image processing unit 18 to decode image data that are encoded by an image coding/decoding unit 65 in the digital camera 105.

This arrangement is substantially the same as that in FIG. 4, except that a display unit 26 is provided.

When the direct printing of compressed image data transferred from the digital camera 105 to the printer 101 is performed using this arrangement, as in the second embodiment a predetermined instruction, such as a direct print mode change instruction, that is entered at an operating unit 69 in the digital camera 105 to interrupt a data transfer is inhibited, invalidated or ignored, using software, during the direct printing processing extending from the start of the transfer of image data until the end of the printing. As a result, the various erroneous operations, such as the erroneous transfer of compressed image data, that occur during direct printing can be reduced. To do this, during direct printing a system controller 70 in the digital camera 105 examines the operating status by checking image data, sub-data and command data transferred from the digital camera 105 to the printer 101, and printer information and control data transferred from the printer 101 to the digital camera 105. When the system controller 70 determines that a direct printing mode operation is in progress, it inhibits the acceptance of the entry at the operating unit 69 of the digital camera 105 of a predetermined instruction, such as a mode change.

In a period during which the entry of an instruction at the operating unit 69 of the digital camera 105 is inhibited, or when a user erroneously enters an inhibited instruction at the operating unit 69 during the above period, a display image generator 73 produces display data for the output of a predetermined alarm message, and based on the display data, the system controller 70 permits an EVF 68 to display the message.

Since the system operation of the printer 101, and the system operation performed between the digital camera 105 and the printer 101 during direct printing in this modification are the same as those explained for the VTR 102, and are performed in the manner as shown in the flowchart in FIG. 6, no further explanation will be given. This completes the description of the second embodiment.

<Third Embodiment>

According to a third embodiment of the present invention, as is shown in FIG. 23, a printer 101 and a camera-incorporated digital VTR (hereinafter referred to as a VTR) 102 are connected with a one-to-one correspondence by a 1394 serial bus cable, so that the direct printing of video data transmitted by the VTR 102 can be performed by the printer 101. A display unit 8 and an operating unit 10 in the VTR 102 serve as user interfaces. An explanation will be given for this embodiment of the present invention wherein a predetermined instruction entered at the operating unit 10 of the VTR 102 is inhibited or invalidated while the VTR 102 is controlling the direct printing processing, including the processing performed by the printer 101. Since the arrangement for the printer 101 and the VTR 102 in the third embodiment is the same as that for the printer 101 and the VTR 102 in FIG. 1, no explanation for it will be given. It should be noted, however, that in this embodiment the operating unit 10 of the VTR 103 is used not only to enter instructions to individual sections of the VTR 102, but also permits the system controller 11 to produce control data for the printer 101 in order to transmit instructions to the printer 101. A large liquid crystal EVF 8 is an effective means by which, during direct printing, to provide easily seen reproduced images and displayed messages for a user.

When, with the arrangement in FIG. 23, compressed video (image) data are transmitted from the VTR 102 to the printer 101 and direct printing is performed, the entry at the operating unit 10 of the VTR 102 of a predetermined instruction that interrupts the direct printing is inhibited, invalidated or ignored using software, so that the number of erroneous operations that occur during direct printing can be reduced. An instruction that interrupts direct printing and that is entered at the operating unit 10 is, for example, a command to rewrite image data in the frame memory 12, which is an output source in the VTR 102, during the image data transmission, or a command to change a direct print mode.

An example instruction, the entry of which is inhibited at the operating unit 10 of the VTR 102, will now be described by employing a mode select switch in FIG. 5, which is provided on the operating unit 10 of the VTR 102. Although this explanation partially overlaps the previous explanation, it will be given in order for the processing to be more easily understood.

"Direct print", "Reproduction", "Photographing" and "OFF" modes can be set using the switch in FIG. 5, and an instruction, such as a command to start a transfer of image data, can be entered by depressing a "PUSH" button. When a mark 2400 of the switch is adjusted to the "Direct print" mode position and the "PUSH" button is depressed, image data that have been read can be transmitted to the printer 101. The mark 2400 is located at the "Direct print" position while direct printing is being performed, and the movement of the mark 2400 (by rotating the switch) from this position to another position is inhibited or invalidated. In addition, another switch key is employed to inhibit or invalidate the entry of a new command to rewrite the contents of the memory 12 or a reproduction command.

In a period during which the entry of an instruction at the operating unit 10 is inhibited, or when a user mistakenly enters an instruction at the operating unit 10 during that period, the display image generator 15 outputs display data to represent a predetermined alarm message, and based on the display data, the system controller 11 permits the EVF 8 to display the message.

Direct printing is initiated when an instruction for the transfer of print image data is entered at the operating unit 10 of the VTR 102, or when image data, including command data representing the direct print start, are received by the printer 101. And when the printer 101 ascertains that the transfer of image data from the VTR 102 and the printing of one image have been completed and transmits to the VTR 102 control data indicating that the printing process has ended; when the 1394 serial bus is disconnected from the VTR 102 and the printer 101; or when a forcible halt command is issued by the printer 101 or the VTR 102, the system controller 11 and the printer controller 23 terminate the direct print mode. The disconnection of the 1394 serial bus can automatically be determined by the printer 101 by detecting the resetting of the 1394 serial bus and the formation of a new network configuration.

Figure 27B:
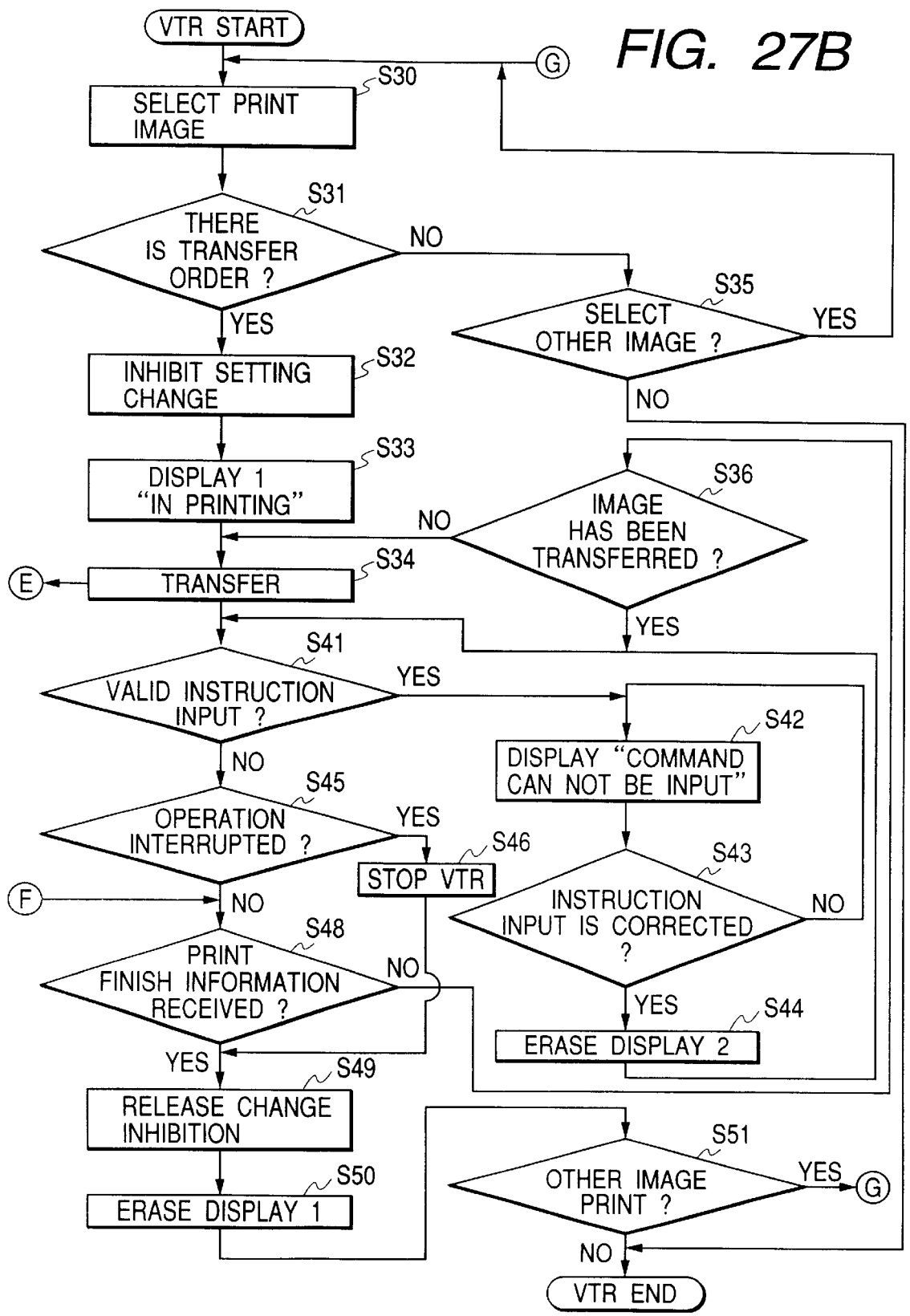
FIG. 27 which comprised of FIGS. 27A and 27B is a flowchart for a direct printing process according to the third embodiment.

The processing performed in the third embodiment of the present invention, including the direct printing process, will now be explained while referring to a flowchart in FIGS. 27A and 27B.

At step S30 a user selects a desired picture to be printed by reading and searching video data recorded on the magnetic tape 3, stores image data corresponding to the desired picture in the frame memory 12 for display on the EVF 8. At step S31, a direct print start instruction is accepted to begin the transfer and the printing of the image data for the selected picture. When, at step S31, an instruction for the transfer of image data is not entered, program control moves to step S35 whereat the user is queried as to whether another picture is to be selected. If the answer is yes, program control moves to step S30, and the picture selection process is repeated. When, at step S35 it is determined that another picture is not to be selected, the processing is thereafter terminated.

If, at step S31, an instruction for the transfer of image data for a desired picture is entered, at step S32 the corresponding image data are read from the memory 12 sequentially or at a single time, and an isochronous (or asynchronous) packet transfer of image data to the printer 101 is begun via the 1394 serial bus. At the same time as the start of the data transfer at step S32, the VTR 102 exercises software control to prevent setup changes by inhibiting or invalidating the entry at the operating unit 10 of predetermined instructions, such as a direct print mode change instruction, that interrupt the transfer of data to the printer 101. At this time, however, necessary commands, such as a forcible halt, are enabled. When the process at step S32 is performed, at step S33 message (1) (e.g., "In processing of print"), which indicates that the entry of instructions has been inhibited, is displayed on the EVF 8 to alert a user and to inform the user of the operating state. The inhibition of setup changes and the display of the message (1) continue until the operating series is terminated. Program control then advances to step S34, whereat the image data stored in the memory 12 are transmitted to the printer 101.

At step S37, the printer 101 is activated and is ready to receive data. When the printer 101 receives image data across the 1394 serial bus, at step S38 printing is performed in accordance with predetermined procedures. If, at step S34, image data are continuously transmitted from the VTR 102, the reception of image data from the VTR 102 and the printing are repeated until at step S40 the printing for one image is completed for each pre determined received data unit, or until at step S39 a halt instruction is entered.

When, at step S41, an invalid instruction or a mode change instruction, which is inhibited, is entered at the operating unit 10 of the VTR 102 during direct printing, i.e., in a period extending from the start of the data transfer to the end of the printing process, at step S42 an alarm message (2) (e.g., "Command input disabled") is displayed on the EVF 8. As a result, a user can identify the current operating state and can prevent the occurrence of an erroneous operation. The presentation of the message (2) at step S42 continues until at step S43 the user corrects the invalid instruction, which is an erroneous entry. When at step S43 the invalid instruction is corrected, at step S44 the alarm message (2) is erased.

If, at step S41, an instruction is not invalid, at step S45 a check is performed to determine whether or not the instruction is for halting the transmission of image data from the VTR 102. If so, program control advances to step S46, whereat the reproduction of the VTR 102 is halted and program control moves to step S49. If, at step S45, the instruction is not a command to halt the operation of the VTR 102, at step S48, a check is performed to determine whether a print end notification has been received from the printer 101. If such a notification has not been received, program control goes to step S36, whereat the remaining image data are transmitted. If there are no remaining image data, program control moves to step S41.

When at step S39 the halting of the printing is instructed, or when at step S40 all the image data have been transmitted by the VTR 102 and printing for one image has been completed by the printer 101, program control goes to step S45, whereat the printer 101 transmits a print end notification to the VTR 102. Following this, at step S52 the printer 101 is set to the standby state.

When, at step S48, the VTR 102 receives the print end notification, at step S49 the VTR 102 releases the inhibition on the entry of the predetermined instructions, and at step S50, erases the message (1) on the EVF 8.

When another picture is to be printed, the VTR 102 returns from step S51 to step S30, and repeats the process beginning with the selection of a desired picture.

As is described above, when, at step S41, an invalid instruction is entered at the operating unit 10 of the VTR 102 during direct printing, program control advances to step S42, and the detection process for such invalid instructions is continued until the direct printing processing is terminated, i.e., until at step S48 a print end notification is received from the printer 101. This completes the explanation for the flowchart in FIGS. 27A and 27B.

When, during direct printing, for a specific reason the 1394 serial bus cable is disconnected from the VTR 102 and the printer 101, the printer 101 can automatically determine when the VTR 102 has been disconnected by detecting the resetting of the bus and the formation of a new network configuration. In the above case, therefore, the direct printing is terminated after the current printing job has been completed. However, when the 1394 serial bus is again connected immediately after the disconnection of the bus has been confirmed, the data transfer may be resumed at the point whereat the transmission was interrupted, and the performance of the direct printing may be continued.

The present invention may be applied for a system constituted by a plurality of apparatuses (e.g., a host computer, an interface unit, a reader and a printer), or to a single apparatus (e.g., a copying machine or a facsimile machine).

The object of the present invention can also be implemented by providing for the system, or an apparatus, a storage medium on which is stored software program code that implements the functions of the above embodiments, in order that the computer of the system, or of the apparatus, can read and execute the program code that is stored on the storage medium.

In this case, the program code read from the recording medium implements the functions of the embodiments, and the storage medium embodies the present invention.

The storage medium for supplying program code is, for example, a floppy disk, a hard disk, an optical disk, a magneto optical disk, a CD-ROM, a CD-R, a magnetic tape, a nonvolatile memory card or a ROM.

Since the program code is read and executed by the computer, included is not only a case where the functions of the above embodiments are accomplished, but also a case where an OS (Operating System) running on the computer performs one part or all of the actual processing, in accordance with the instructions contained in the program code, in order to implement the functions of the embodiments.

Furthermore, also included is a case where the program code read from the storage medium is written in a memory, on a function extension board inserted into the computer or in a function extension unit connected to the computer, and a CPU of the function extension board or the function extension unit performs one part or all of the actual processing, in accordance with the instructions contained in the program code, in order to implement the functions of the embodiments.

As is described above, according to the embodiments of the present invention, during the direct printing process in which the VTR, the digital camera, or another data source outputs image data directly to the printer, the entry of a command at the data source that may cause a printing failure is inhibited, so that no problems occur when direct printing is being performed.

Further, since the printer 101 can control the direct printing, including the control of the data source, such as the VTR, an easy user interface can be provided even when an adequate display device is not provided for the data source, and the direct printing process can be performed. Since the direct printing state and an alarm message corresponding to an invalid instruction, if it is entered at the operating unit, are displayed, a user can obtain a precise understanding of the current printing state.

Furthermore, since the 1394 serial bus is employed for direct printing, image data to be printed can be transferred directly from the data source to the printer 101, without passing through the PC. As a result, a rapid printing process can be preformed that is not affected by the operating state of the PC, and a load imposed on the PC due to the printing of data can be reduced.

As is described above, according to the present invention, the first node and the second node are directly connected so that they can exchange data directly.

Further, since the entry of a predetermined instruction at the first node is inhibited during the transmission of data from the first node to the second node via the interface bus, the occurrence of a defect during the transmission of data can be prevented.

In addition, since the entry of a predetermined instruction at the first node is inhibited during the transmission of data from the first node to the second node, an alarm message is displayed if a predetermined instruction is entered and this can be used to notify a user that an unauthorized entry has been made.

What is claimed is:

1. A data communication system comprising:

a first node that includes an image display monitor and an operating unit;

a second node that includes an operating unit but does not include an image display monitor, said first and second nodes communicating with each other by a DS-Link; and arbitration means for providing an arbitration, for use of a communication path, between an instruction input at the operating unit of said first node and an instruction input at the operating unit of said second node.

2. A data communication system according to claim 1, wherein said arbitration means gives a higher priority to an operation for said first node than to an operation for said second node.

3. A data communication system according to claim 1, wherein said arbitration means gives a higher priority to an operation for said second node than to an operation for said first node.

4. A data communication system according to claim 1, wherein said first node and said second node are connected together by a serial bus.

5. A data communication system according to claim 4, wherein said serial bus conforms to an IEEE 1394 standard.

6. A data communication system according to claim 1, wherein said second node is a printer.

7. A data communication system according to claim 6, wherein said arbitration means invalidates a manipulation of an operating unit at the printer while printing is being performed by the printer.

8. A printing system comprising:

a video apparatus that includes an image display monitor and an operating unit;

a printer that includes an operating unit; and arbitration means for providing an arbitration, for use of a communication path, between an instruction input at the operating unit of said video apparatus and an instruction input at the operating unit of said printer.

9. A printing system according to claim 8, wherein said video apparatus transmits video data isochronously, and receives operating state information for said printer asynchronously.

10. A printing system according to claim 9, wherein the operating state information for said printer is displayed on the image display monitor.

11. Data communication apparatus constituting a first node or a second node in a data communication system, wherein the data communication system comprises:

a first node that includes an image display monitor and an operating unit;

a second node that includes an operating unit but does not include an image display monitor, the first and second nodes communicating with each other by a DS-Link; and arbitration means for providing an arbitration, for use of a communication path, between an instruction input at the operating unit of the first node and an instruction input at the operating unit of the second node.

12. A data communication system comprising:
a first node that includes an image display monitor and an operating unit;
a second node that includes an operating unit but does not include an image display monitor, said first and second nodes communicating with each other by a DS-Link; and
arbitration means for providing an arbitration, for use of a communication path, between an instruction input at the operating unit of said first node and an instruction input at the operating unit of said second node, wherein
said first node is an image reproduction device and said second node is a printing device, and
the instructions input at the operating units of said first and second nodes concern respective printing operations.

13. A data communication system according to claim 12, wherein said arbitration means gives a higher priority to an operation for said first node than to an operation for said second node.

14. A data communication system according to claim 12, wherein said arbitration means gives a higher priority to an operation for said second node than to an operation for said first node.

15. A data communication system according to claim 12, wherein said first node and said second node are connected together by a serial bus.

16. A data communication system according to claim 15, wherein said serial bus conforms to an IEEE 1394 standard.

17. A data communication system according to claim 12, wherein said second node is a printer.

18. A data communication system according to claim 17, wherein said arbitration means invalidates a manipulation of an operating unit at the printer while printing is being performed by the printer.

* * * * *

UNITED STATES PATENT AND TRADEMARK OFFICE
CERTIFICATE OF CORRECTION

PATENT NO.     : 6,298,405 B1
DATED          : October 2, 2001
INVENTOR(S)    : Masamichi Ito et al.

It is certified that error appears in the above-identified patent and that said Letters Patent is hereby corrected as shown below:

Column 1,
Line 35, "example" should read -- example of a --.

Column 4,
Lines 24 and 30, "comprised of" should read -- is comprised of --.

Column 11,
Line 1, "wining" should read -- winning --.

Column 14,
Line 43, "instructions;" should read -- instruction; --.

Column 15,
Line 49, "data" should read -- data is --.

Column 24,
Line 14, "indicate s" should read -- indicates --.

Column 28,
Line 6, "pre determined" should read -- predetermined --.

Column 30,
Line 17, "node." should read -- node; ¶ wherein said second node is a printer, and said instructions concern images transferred between said first node and said second node --.
Line 46, "printer." should read -- printer, ¶ wherein said instructions concern images transferred between said video apparatus and said printer. --.
Line 67, "node." should read -- node, ¶wherein said second node is a printer, and said instructions concern images transferred between said first node and said second node --.

UNITED STATES PATENT AND TRADEMARK OFFICE
CERTIFICATE OF CORRECTION

PATENT NO. : 6,298,405 B1
DATED : October 2, 2001
INVENTOR(S) : Masamichi Ito et al.

It is certified that error appears in the above-identified patent and that said Letters Patent is hereby corrected as shown below:

<u>Column 31,</u>
Line 14, "respective printing opera-" should read -- images transferred between said first node and said second node. --.
Line 15, "tions." should be deleted.

Signed and Sealed this

Eleventh Day of June, 2002

Attest:

Attesting Officer

JAMES E. ROGAN
*Director of the United States Patent and Trademark Office*